US012643075B1

(12) United States Patent
Alhooshani et al.

(10) Patent No.: US 12,643,075 B1
(45) Date of Patent: Jun. 2, 2026

(54) HIGH FLUX NANOFILTRATION MEMBRANE

(71) Applicant: King Fahd University of Petroleum and Minerals, Dhahran (SA)

(72) Inventors: Khalid Rashed Alhooshani, Dhahran (SA); Shehzada Muhammad Sajid Jillani, Dhahran (SA); Elham Saud Alkhulaify, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 19/190,385

(22) Filed: Apr. 25, 2025

(51) Int. Cl.

| | |
|---|---|
| *B01D 69/10* | (2006.01) |
| *B01D 61/02* | (2006.01) |
| *B01D 69/02* | (2006.01) |
| *B01D 69/12* | (2006.01) |
| *B01D 71/56* | (2006.01) |
| *C02F 1/44* | (2023.01) |
| *C02F 101/30* | (2006.01) |
| *C02F 101/34* | (2006.01) |
| *C02F 101/36* | (2006.01) |
| *C02F 101/38* | (2006.01) |

(52) U.S. Cl.
CPC ......... *B01D 69/107* (2022.08); *B01D 61/027* (2013.01); *B01D 69/02* (2013.01); *B01D 69/1214* (2022.08); *B01D 69/1251* (2022.08); *B01D 71/56* (2013.01); *C02F 1/442* (2013.01); *B01D 2325/06* (2013.01); *B01D 2325/20* (2013.01); *C02F 2101/305* (2013.01); *C02F 2101/34* (2013.01); *C02F 2101/345* (2013.01); *C02F 2101/36* (2013.01); *C02F 2101/38* (2013.01); *C02F 2101/40* (2013.01)

(58) Field of Classification Search
None
See application file for complete search history.

(56) References Cited

U.S. PATENT DOCUMENTS

| | | | | |
|---|---|---|---|---|
| 4,772,391 A | * | 9/1988 | Baker | B01D 69/08 264/41 |
| 2020/0114317 A1 | * | 4/2020 | Charest | B01D 61/002 |
| 2021/0245111 A1 | | 8/2021 | Lee et al. | |

FOREIGN PATENT DOCUMENTS

| | | | | |
|---|---|---|---|---|
| CN | 117983057 A | 5/2024 | | |
| WO | WO-2017099671 A1 | * | 6/2017 | F03G 7/015 |

OTHER PUBLICATIONS

Micah Bells Maris Yap Ang, et al., "Correlating PSI support physicochemical properties with the formation of piperazine-based polyamide and evaluating the resultant nanofiltration membrane performance", Polymers (Basel) 2017, vol. 9, Issue 10, 17 Pages.
Megha M., et al., "Desalination Performance of Multi-Walled Carbon Nanotubes Added Polymeric Nanocomposite Membrane", Water Air & Soil Pollution, vol. 235, Article 801, 2024, 16 Pages.
Aoling Zhang, et al.. "Preparation polyamide nanofiltration membrane by interfacial polymerization". Desalination and Water Treatment, vol. 37. Issue 1-3, 2012, pp. 238-243, 7 Pages.
Sanne Hermans, et al., "Study of synthesis parameters and active layer morphology of interfacially polymerized polyamide-polysulfone membranes" Reactive and Functional Polymers, vol. 86 (2015) p. 199-208, 10 Pages.

* cited by examiner

*Primary Examiner* — Ryan B Huang
(74) *Attorney, Agent, or Firm* — Oblon, McClelland, Maier & Neustadt, L.L.P.

(57) ABSTRACT

A membrane includes a base layer and a support layer formed on the base layer. The support layer includes polysulfone (Psf), polyvinylpyrrolidone (PVP), and at least one diamine selected from the group consisting of 2-chloro-4, 6-diamino-1,3,5-triazine, benzoguanamine, and acetoguanamine. The membrane further includes a polyamide layer formed on the support layer. The polyamide layer includes repeating units derived from piperazine and repeating units derived from trimesoylchloride. The polyamide is covalently bonded to at least some molecules of the at least one diamine in the support layer via an amide bond.

19 Claims, 30 Drawing Sheets

Diamine 2 based Membranes

Ra = 12.7 nm
Rq = 16.3 nm (DA2 C1 PA)

Diamine 2 based Membranes

Ra = 5.08 nm
Rq = 6.45 nm (DA2 C2 PA)

HIGH FLUX NANOFILTRATION MEMBRANE

BACKGROUND

Technical Field

The present disclosure relates generally to water desalination technologies, and more particularly to a composite membrane including a base layer, a support layer having one or more diamine compounds, and a polyamide layer formed thereon, having high separation performance and chemical resistance.

Description of Related Art

The 'background' description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Presently, the need for clean water resources is increasing globally on a yearly basis due to rapid expansion in human population coupled with the growth in agriculture, industrialization, and the energy sector. However, the accessibility to potable/clean water has been declining at a faster rate. The exploration of alternative potable water supply has led to the usage of sea water and waste water as new water sources. Amongst other water treatment methodologies, thermal desalination is a high-cost conventional water desalination method that requires a great deal of energy. Membrane processes have shown good performance in terms of desalination and decontamination of polluted water. Compared to the conventional water purification practices, membrane-based separation is an effective and reliable water treatment process with less energy demand. In addition, membrane processes offer flexibility of using different membrane materials, polymers, and pore sizes. Membrane processes include microfiltration (MF), ultrafiltration (UF), nanofiltration (NF) and reverse osmosis (RO) [T. Kamada, T. Ohara, T. Shintani, T. Tsuru, *Controlled surface morphology of polyamide membranes via the addition of co-solvent for improved permeate flux, J Memb Sci* 467 (2014) 303-312; and M. R. Esfahani, S. A. Aktij, Z. Dabaghian, M. D. Firouzjaei, A. Rahimpour, J. Eke, I. C. Escobar, M. Abolhassani, L. F. Greenlee, A. R. Esfahani, A. Sadmani, N. Koutahzadeh, *Nanocomposite membranes for water separation and purification: Fabrication, modification, and applications, Sep Purif Technol* 213 (2019) 465-499].

Micropollutants in waste water are a major threat to water sustainability with increasing quantities and varieties. Micropollutants can include persistent chemical contaminants that remain in treated water in trace amounts and may severely affect the human health. This is because some micropollutants are endocrine disruptors that may cause hormonal imbalance and disorders in metabolic, immunological, and neurological systems in humans. Micropollutants include, but are not limited to, pharmaceuticals and personal care products, antibiotics, medicines, food additives, pesticides, and industrial chemicals. The pollutants eventually spread to ground and surface waters, causing adverse impacts on human health and the environment [A. Matin, S. M. S. Jillani, U. Baig, I. Ihsanullah, K. Alhooshani, *Removal of pharmaceutically active compounds from water sources using nanofiltration and reverse osmosis mem-*

*branes: Comparison of removal efficiencies and in-depth analysis of rejection mechanisms, J Environ Manage* 338 (2023) 117682; and J. F. Nure, T. T. I. Nkambule, *The recent advances in adsorption and membrane separation and their hybrid technologies for micropollutants removal from wastewater, Journal of Industrial and Engineering Chemistry* 126 (2023) 92-114].

Water purification based on membranes offers many advantages such as the relatively low-cost, easy operation, and high selectivity compared to conventional purification techniques. Thin film composite (TFC) membranes (NF and RO) have recently drawn a great deal of attention due to the ability to reject high amounts of organics as well as monovalent, and multivalent ions present in water [M. R. Esfahani, N. K outahzadeh, A. R. Esfahani, M. D. Firouzjaei, B. Anderson, L. Peck, *A novel gold nanocomposite membrane with enhanced permeation, rejection and self-cleaning ability, J Memb Sci* 573 (2019) 309-319]. In comparison to RO membranes, NF membranes can have higher water permeability, operate at lower pressure, and be more effective in rejecting divalent ions due to intermediate pore size of about 1 nanometre. Therefore, NF membranes may be ideal for water treatment from various resources. An NF membrane can include a thin polyamide layer formed over a polymeric porous layer on a non-woven support. The active polyamide layer can be prepared by interfacial polymerization (IP) between a diamine solution and a crosslinker solution over a porous polymeric support [Z. Wang, S. Liang, Y. Jin, L. Zhao, L. Hu, *Controlling structure and properties of polyamide nanofilms by varying amines diffusivity in organic phase, J Memb Sci* 574 (2019) 1-9; and Q. Xie, S. Zhang, Z. Hong, H. Ma, B. Zeng, X. Gong, W. Shao, Q. Wang, *A novel double-modified strategy to enhance the performance of thin-film nanocomposite nanofiltration membranes: Incorporating functionalized graphene into supporting and selective layers, Chemical Engineering Journal* 368 (2019) 186-201].

However, there are major limitations in the membrane-based separation. The limitations may include biofouling of the membrane after long term operation, which results in the formation of a biofilm on the surface and reduction in the permeability. Another limitation for a polymetric membrane is the trade-off between permeability and rejection rate. Furthermore, it has been reported that the efficiency of typical NF membranes in terms of removing micropollutants varies significantly [J. F. Nure, T. T. I. Nkambule, *The recent advances in adsorption and membrane separation and their hybrid technologies for micropollutants removal from wastewater, Journal of Industrial and Engineering Chemistry* 126 (2023) 92-114]. There is evidence that the properties and structure of the support layer, commonly polysulfone, may be important for the fabrication of membranes with high permselectivity, because the support layer influences the process of IP and eventually the formation of polyamide. Hence, modification in a polysulfone layer may directly affect the features of the coated polyamide layer [Y. J. Lim, K. Goh, G. S. Lai, Y. Zhao, J. Torres, R. Wang, *Unraveling the role of support membrane chemistry and pore properties on the formation of thin-film composite polyamide membranes, J Memb Sci* 640 (2021) 119805]. For instance, impact of altering physicochemical properties of the support on the filtration performance of TFC membranes was studied [N. Misdan, W. J. Lau, A. F. Ismail, T. Matsuura, D. Rana, *Study on the thin film composite poly (piperazine-amide) nanofiltration membrane: Impacts of physicochemical properties of substrate on interfacial polymerization formation, Desalination* 344 (2014) 198-205]. Three different polymers (polyethersulfone, polysulfone, and polyether-imide) were used as a substrate layer and the PA layer in the PSF based membrane was highly cross-linked which led to an increase in the rejection rate associated with a decrease in water flux.

In order to control the performance of NF membrane, several studies have explored the addition of different additives to the casting solution of the support layer. For instance, the effect of incorporating small amounts of certain organic acids was reported on the separation performance of NF membranes. Citric acid, ascorbic acid, and malic acid were incorporated into the casting solutions of polysulfone. The aforementioned modification influenced the morphology, permeation performance, and rejection rates of the membrane for xenobiotics. Further, it was stated that the inclusion of other organic acids (lactic, tartaric, and methacrylic acid) affected the characteristics of the membrane by increasing the thickness, hydrophilicity, and porosity of the resulting membrane. The aforementioned modification led to an increased water flux and salt rejection capability compared to the pure membrane. Other researchers evaluated the effect of nanomaterial additives in NF membranes. For instance, nanosheets of graphene oxide (GO) were blended in the support layer of PSF and reported a decrease in the surface charge as the concentration of the added GO increased [H.-R. Chae, C.-H. Lee, P.-K. Park, I.-C. Kim, J.-H. Kim, *Synergetic effect of graphene oxide nanosheets embedded in the active and support layers on the performance of thin-film composite membranes, J Memb Sci* 525 (2017) 99-106]. The foregoing phenomenon was attributed to the presence of —OH, —COOH, and epoxy groups in the GO nanomaterial. Consequently, the rejection of the monovalent salt (NaCl) was higher than the control membrane due to the repulsive force between the chloride ion and the surface of the membrane. Moreover, they reported a change in the hydrophilicity and surface roughness of the altered membrane, which improved the permeate flux and salt rejection. Similarly, GO nanosheets were also added in varying amounts to the PSF substrate, followed by poly-amide formation [G. S. Lai, W. J. Lau, P. S. Goh, A. F. Ismail, N. Yusof, Y. H. Tan, *Graphene oxide incorporated thin film nanocomposite nanofiltration membrane for enhanced salt removal performance, Desalination* 387 (2016) 14-24]. It was concluded that 0.3 wt. % of GO provided a superior water flux performance and salt rejection owing to the negatively charged and hydrophilic nature of GO nanosheets. A new membrane containing modified multi-walled carbon nanotubes in PSF support and silver nanoparticles in the active layer was introduced, which showed an enhanced water flux and anti-fouling properties.

Numerous studies have been conducted to examine the outcome of employing different additives to an NF membrane. However, there is still a pressing requirement for an advanced membrane for water filtration with high flux characteristics. Accordingly, one object of the present disclosure is to provide a high flux nanofiltration membrane that may circumvent the above-listed drawbacks and limitations of the materials and methods known in the art.

SUMMARY

In an exemplary embodiment, a membrane includes a base layer and a support layer formed on the base layer. The support layer includes polysulfone (Psf), polyvinylpyrrolidone (PV P), and at least one diamine selected from the group consisting of 2-chloro-4,6-diamino-1,3,5-triazine, benzoguanamine, and acetoguanamine. The membrane further includes a polyamide layer formed on the support layer. The polyamide layer includes repeating units derived from piperazine and repeating units derived from trimesoylchloride. The polyamide is covalently bonded to at least some molecules of the at least one diamine in the support layer via an amide bond.

In some embodiments, the support layer of the membrane is obtained by executing a wet phase inversion process using a casting solution including Psf, PVP, and the at least one diamine. In some embodiments, the casting solution used to form the support layer includes, based on total weight of the casting solution, 10 weight percentage (wt. %) to 30 wt. % of Psf, 0.5 wt. % to 5 wt. % of PVP, and 0.01 wt. % to 0.5 wt. % of the at least one diamine.

In some embodiments, the casting solution used to form the support layer includes, based on total weight of the casting solution, 18 wt. % of Psf, 2 wt. % of PVP, and 0.05 wt. % to 0.1 wt. % of the at least one diamine.

In some embodiments, the casting solution is obtained by dissolving Psf, PVP and the at least one diamine in a solvent including N,N-dimethylacetamide (DMAC) at a temperature of 60° C. to 100° C.

In some embodiments, the support layer is obtained by executing the wet phase inversion process of the casting solution on the base layer including a nonwoven polyether terephthalate layer that is pre-saturated with DMAC.

In some embodiments, the polyamide is covalently bonded to the at least some molecules of the at least one diamine in the support layer via the amide bond so that the polyamide extends into pores of the support layer.

In some embodiments, molecules of the at least one diamine are homogeneously distributed in the support layer.

In some embodiments, the polyamide layer of the membrane is at least partially in the form of globules on a surface of the polyamide layer, and the globules have an average size of 100 nanometres (nm) to 1000 nm.

In some embodiments, the at least one diamine is benzoguanamine which is present in the casting solution at a concentration of 0.1 wt. % based on the total weight of the casting solution, the membrane exhibits a water flux rate of 95.4 $L\cdot m^{-2}\cdot h^{-1}$ at a feed pressure of 15 bar, and a comparative membrane, which is the same as the membrane except without the at least one diamine, has a water flux rate of 25.8 $L\cdot m^{-2}\cdot h^{-1}$ at the feed pressure.

In some embodiments, the membrane has an 85% reduction in a surface roughness compared to the comparative membrane.

In some embodiments, the membrane has a rejection rate of about 98% for ranolazine, and the comparative membrane has a rejection rate of about 50% for ranolazine.

In some embodiments, the membrane has a rejection rate of about 51% for NaCl, while the comparative membrane has a rejection rate of about 41% for NaCl.

In some embodiments, the polyamide layer is obtained by executing an interfacial polymerization process of a first solution including piperazine and a second solution including trimesoylchloride.

In some embodiments, the first solution includes 2 wt. % piperazine, 4 wt. % triethylamine, and water based on the total weight of the first solution, and the second solution includes 0.3 wt. % trimesoylchloride and n-hexane based on a total weight of the second solution. In some embodiments, the execution of the interfacial polymerization process includes immersing the support layer into the first solution, removing the support layer from the first solution, dipping the support layer into the second solution, rinsing the support layer with n-hexane, and maintaining the support layer at a temperature of 70° C. for 20 minutes.

In some embodiments, the at least one diamine is 2-chloro-4,6-diamino-1,3,5-triazine which is present in the casting solution at a concentration of 0.05 wt. % based on the total weight of the casting solution, and the membrane has a rejection rate of 54.5% for acetaminophen, and a comparative membrane has a rejection rate of 25.8% for acetaminophen.

In some embodiments, the membrane has a rejection rate of about 49% for NaCl and a water flux rate of 30.0 $L \cdot m^{-2} \cdot h^{-1}$ at a feed pressure of 15 bar, and the comparative membrane has a rejection rate of about 41% for NaCl and a water flux rate of 25.8 $L \cdot m^{-2} \cdot h^{-1}$ at the feed pressure.

In another exemplary embodiment, a method of filtration is provided. The method includes filtering a liquid mixture through the membrane. The liquid mixture includes water and at least one of a salt or an organic molecule.

In some embodiments, the organic molecule includes acetaminophen, sulfamethoxazole, lomefloxacin, ranolazine, diatrizoic acid, or a combination thereof.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings.

FIG. 1A illustrates a structure of 2-chloro-4,6-diamino-1, 3,5-triazine (DA1), according to certain embodiments.

FIG. 1B illustrates a structure of benzoguanamine (DA2), according to certain embodiments.

FIG. 1C illustrates a structure of acetoguanamine (DA3), according to certain embodiments.

DETAILED DESCRIPTION

Figure 2:
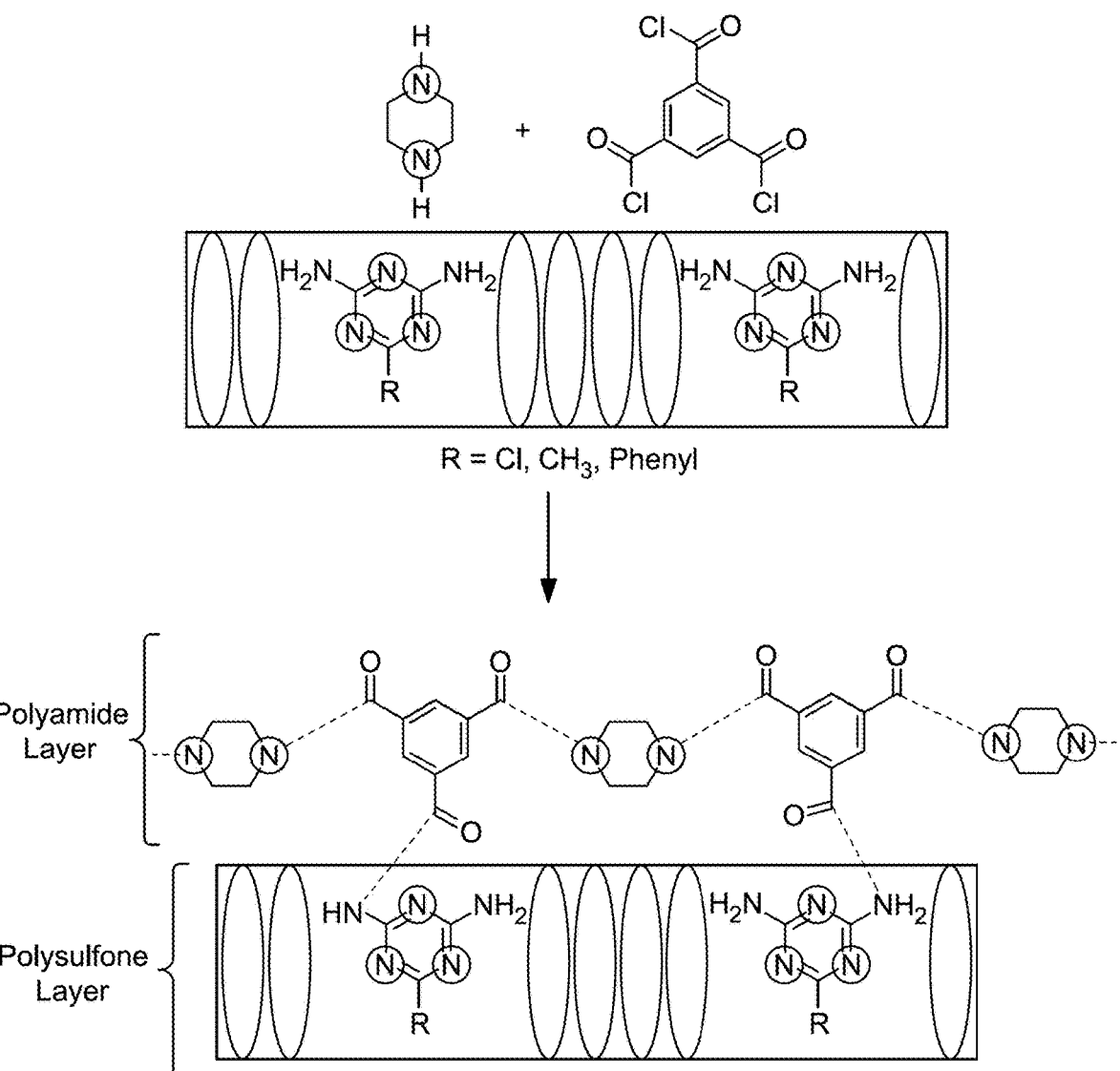
FIG. 2 depicts a chemical interaction between a support and an active layer incorporated in a high-flux nanofiltration membrane, according to certain embodiments.
Figure 3A:
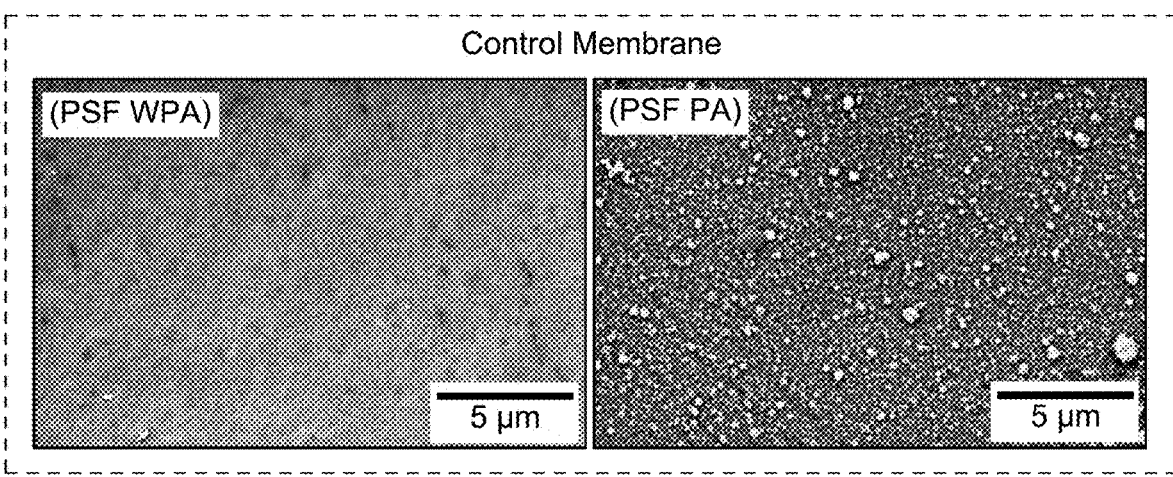
FIG. 3A depicts the field emission scanning electron microscopy (FESEM) results for a control membrane (polysulfone support without polyamide and polysulfone support with polyamide), according to certain embodiments.
Figure 3B:
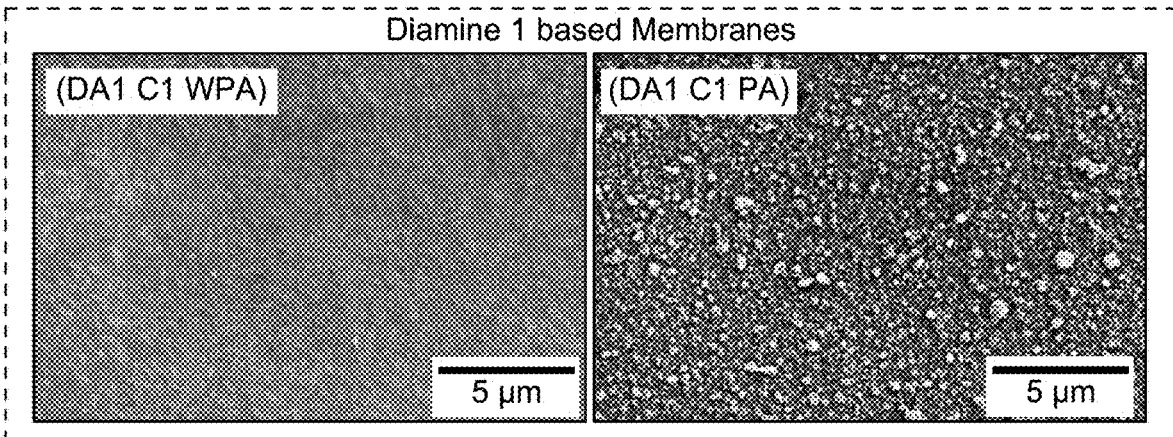
FIG. 3B depicts the FESEM results for a DA1 membrane without polyamide and the DA1 membrane with polyamide, at a concentration 'C1', according to certain embodiments.
Figure 3C:
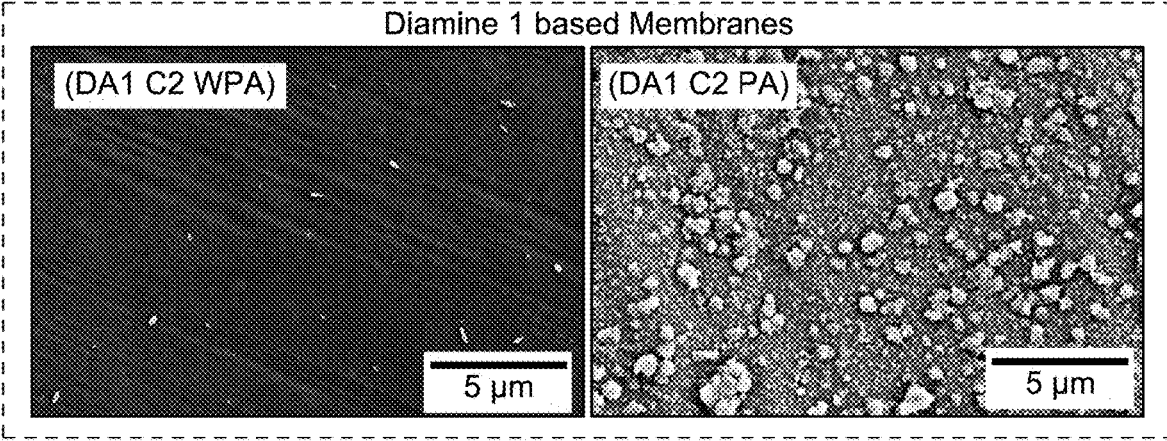
FIG. 3C depicts the FESEM results for a DA1 membrane without polyamide and the DA1 membrane with polyamide, at a concentration 'C2', according to certain embodiments.
Figure 3D:
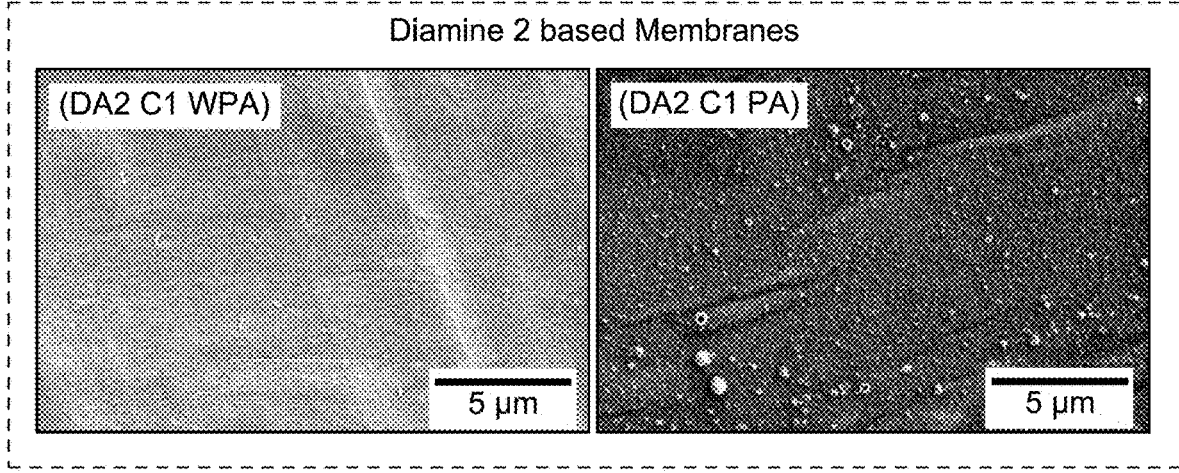
FIG. 3D depicts the FESEM results for a DA2 membrane without polyamide and the DA2 membrane with polyamide, at a concentration 'C1', according to certain embodiments.
Figure 3E:
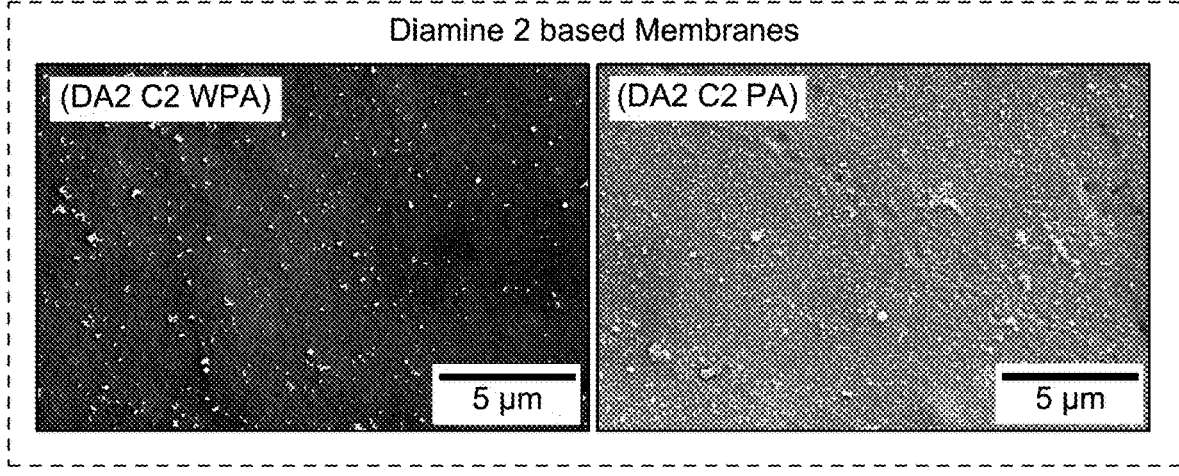
FIG. 3E depicts the FESEM results for a DA2 membrane without polyamide and the DA2 membrane with polyamide, at a concentration 'C2', according to certain embodiments.
Figure 3F:
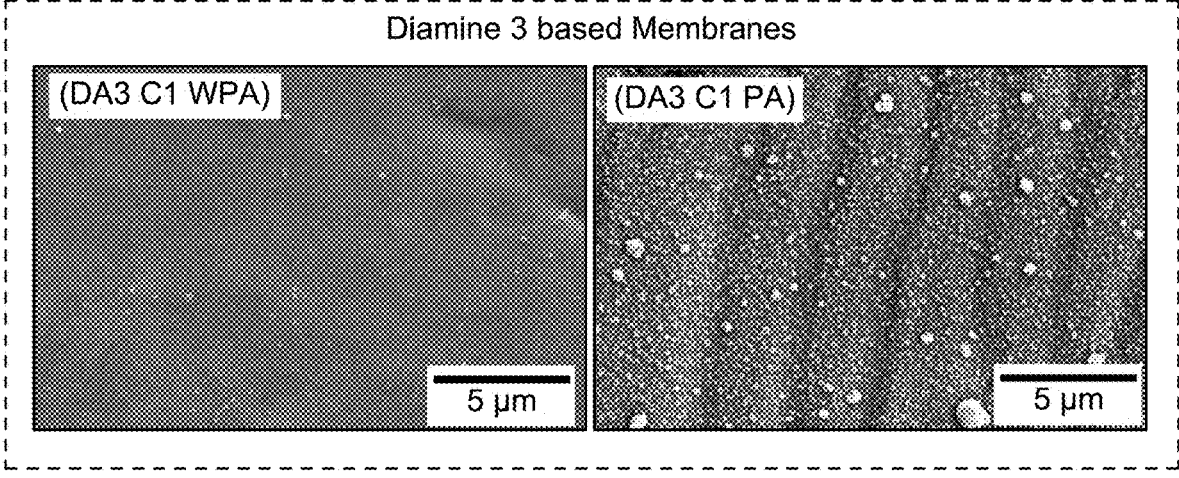
FIG. 3F depicts the FESEM results for a DA3 membrane without polyamide and the DA3 membrane with polyamide, at a concentration 'C1', according to certain embodiments.
Figure 3G:
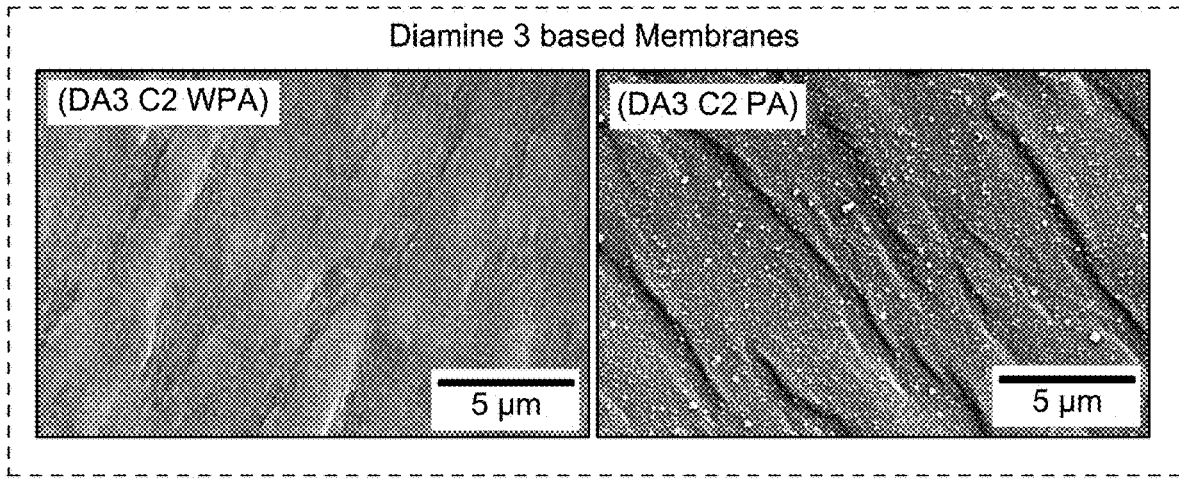
FIG. 3G depicts the FESEM results for a DA3 membrane without polyamide and the DA3 membrane with polyamide, at a concentration 'C2', according to certain embodiments.

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, such as reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all isotopes of a given compound or formula, unless otherwise noted. The present disclosure is intended to include all hydration states of a given compound or formula, unless otherwise noted or when heating a material.

As used herein, the term 'membrane' refers to a porous structure that is capable of separating components of a homogeneous or heterogeneous fluid. In particular, 'pores' in the sense of the present disclosure indicate voids allowing fluid communication between different sides of the structure. M ore particular in use when a homogeneous or heterogeneous fluid is passed through the membrane, some components of the fluid can pass through the pores of the membrane into a 'permeate stream', some components of the fluid can be retained by the membrane and can thus accumulate in a 'retentate' and/or some components of the fluid can be rejected by the membrane into a 'rejection stream'. Membranes can be of various thicknesses, with homogeneous or heterogeneous structures. Membranes can be in the form of flat sheets or bundles of hollow fibers. Membranes can also be in various configurations, including but not limited to spiral wound, tubular, hollow fiber, and other configurations identifiable to a skilled person upon a reading of the present disclosure. Membranes can also be classified according to their pore diameter. Membranes can be neutral or charged, and particle transport can be active or passive.

The latter can be facilitated by pressure, concentration, and chemical or electrical gradients of the membrane process.

As used herein, the term 'pore' refers to a small opening or void within a material, typically on the microscopic or nanoscopic scale, that allows the passage of fluids or gases. Pores may be important in determining the material's porosity and can influence properties such as surface area, adsorption capacity, and reactivity.

As used herein, the term 'contaminants' refer to impurities, harmful substances or pollutants that degrade the quality of water, air, soil, or food, making them unsafe or unsuitable for specific uses. In water, contaminants include biological agents such as bacteria, viruses, and parasites; chemical substances such as heavy metals, pesticides, pharmaceuticals, and industrial chemicals; and physical materials such as dirt, debris, and sediment. These contaminants can pose serious risks to human health, the environment, and ecosystems, depending on their type, concentration, and exposure levels.

The contaminants may include heavy metals (e.g., lead, mercury, arsenic), pesticides, herbicides, nitrates, phosphates, pharmaceuticals (e.g., antibiotics, painkillers, hormones), solvents, oils, bacteria (e.g., *E. coli*), viruses, parasites, plastics, detergents, cyanide, sulfuric acid, sediment, a dye, a phenol, a polycyclic aromatic hydrocarbon (PAH), a persistent organic pollutant, an inorganic salt and so on.

A dye is a colored substance that chemically binds to or exists in a material it may be intended to color. Generally, a dye is applied in a solution, typically an aqueous solution.

Examples of dyes include, but are not limited to, acridine dyes, which are acridine and its derivatives such as acridine orange, acridine yellow, acriflavine, and gelgreen; anthraquinone dyes, which are anthroaquinone and its derivatives such as acid blue 25, alizarin, anthrapurpurin, carminic acid, 1,4-diamno-2,3-dihydroanthraquinone, 7,14-dibenzypyrenequinone, dibromoanthrone, 1,3-dihydroxyanthraquinone, 1,4-dihydroxyanthraquinone, disperse red 9, disperse red 11, indanthrone blue, morindone, oil blue 35, parietin, quinizarine green SS, remazol brilliant blue R, solvent violet 13, 1,2,4-trihydroxyanthraquinone, vat orange 1, and vat yellow 1; diaryl methane dyes such as auramine O, triarylmethane dyes such as acid fuchsin, aluminon, aniline blue WS, aurin, aurintricarboxylic acid, brilliant blue FCF, brilliant green, bromocresol green, bromocresol purple, bromocresol blue, bromophenol blue, bromopyrogallol red, chlorophenol red, coomassie brilliant blue, cresol red, O-cresolphthalein, crystal violet, dichlorofluorescein, ethyl green, fast green FCT, FIASH-EDT2, fluoran, fuchsine, green S, light green SF, malachite green, merbromin, metacresol purple, methyl blue, methyl violet, naphtholphthalein, new fuchsine, pararosaniline, patent blue V, phenol red, phenolphthalein, phthalein dye, pittacal, spirit blue, thymol blue, thymolphthalein, Victoria blue BO, Victoria blue R, water blue, xylene cyanol, and xylenol orange; azo dyes such as acid orange 5, acid red 13, alican yellow, alizarine yellow R, allura red AC, amaranth, amido black 10B, aniline yellow, arylide yellow, azo violet, azorubine, basic red 18, biebrich scarlet, Bismarck brown Y, black 7984, brilliant black BN, brown FK, chrysoine resorcinol, citrus red 2, congo red, D & C red 33, direct blue 1, disperse orange 1, eriochrome black T, evans blue, fast yellow A B, orange 1, hydroxynaphthol blue, janus green B, lithol rubine BK, metanil yellow, methyl orange, methyl red, methyl yellow, mordant brown 33, mordant red 19, naphthol AS, oil red O, oil yellow DE, orange B, orange G, orange GGN, para red, pigment yellow 10, ponceau 2R, prontosil, red 2G, scarlet GN, Sirius red, solvent red 26, solvent yellow 124, sudan black B, sudan I, sudan red 7B, sudan stain, tartrazine, tropaeolin, trypan blue, and yellow 2G; phthalocyanine dyes such as phthalocyanine blue BN, phthalocyanine Green G, Alcian blue, and naphthalocyanine, azin dyes such as basic black 2, mauveine, neutral red, Perkin's mauve, phenazine, and safranin; indophenol dyes such as indophenol and dichlorophenolindophenol; oxazin dyes; oxazone dyes;

thiazine dyes such as azure A, methylene blue, methylene green, new methylene blue, and toluidine blue; thiazole dyes such as primuline, stains-all, and thioflavin; xanthene dyes such as 6-carboxyfluorescein, eosin B, eosin Y, erythosine, fluorescein, rhodamine B, rose bengal, and Texas red; fluorone dyes such as calcein, carboxyfluorescein diacetate succinimidyl ester, fluo-3, fluo-4, indian yellow, merbromin, pacific blue, phloxine, and seminaphtharhodafluor; or rhodamine dyes such as rhodamine, rhodamine 6G, rhodamine 123, rhodamine B, sulforhodamine 101, and sulforhodamine B.

A phenol is an organic compound having a hydroxyl group (—OH) bonded directly to an aromatic hydrocarbon group. Examples of phenols include, but are not limited to, phenol (the namesake of the group of compounds), bisphenols (including bisphenol A), butylated hydroxytoluene (BHT), 4-nonylphenol, orthophenyl phenol, picric acid, phenolphthalein and its derivatives mentioned above, xylenol, diethylstilbestrol, L-DOPA, propofol, butylated hydroxyanisole, 4-tert-butylcatechol, tert-butylhydroquinone, carvacrol, chloroxyleol, cresol (including M-, O-, and P-cresol), 2,6-di-tert-butylphenol, 2,4-dimethyl-6-tert-butylphenol, 2-ethyl-4,5-dimethylphenol, 4-ethylguaiacol, 3-ethylphenol, 4-ethylphenol, flexirubin, mesitol, 1-nonyl-4-phenol, thymol, 2,4,6-tri-tert-butylphenol, chlorophenol (including 2-, 3-, and 4-chlorophenol), dichlorophenol (including 2,4- and 2,6-dichlorophenol), bromophenol, dibromophenol (including 2,4-dibromophenol), nitrophenol, norstictic acid, oxybenzone, and paracetamol (also known as acetoaminophen).

Polycyclic aromatic hydrocarbon (PAH) is an aromatic hydrocarbon composed of multiple aromatic rings. Examples of PAH include naphthalene, anthracene, phenanthrene, phenalene, tetracene, chrysene, triphenylene, pyrene, pentacene, benzo[a]pyrene, corannulene, benzo[g,h,i]perylene, coronene, ovalene, benzo[c]fluorine, acenaphthene, acenaphthylene, benz[a]anthracene, benzo[b]fluoranthene, benzo[j]fluoranthene, benzo[k]fluoranthene, benzo[e]pyrene, cyclopenta [c,d]pyrene, dibenz [a,h]anthracene, dibenzo[a,e]pyrene, dibenzo[a,h]pyrene, dibenzo[a,i] pyrene, dibenzo[a,I]pyrene, fluoranthene, fluorine, indeno [1,2,3-c,d]pyrene, 5-methylchrysene, naphthacene, pentaphene, picene, and biphenylene.

A herbicide (also known as 'weedkiller') is a substance that is toxic to certain plants and may kill, inhibit the growth of, or prevent the germination of certain plants. Herbicides are typically used to control the growth of or remove unwanted plants from an area of land, particularly in an agricultural context. Examples of herbicides include, but are not limited to, 2,4-D, aminopyralid, chlorsulfuron, clopyralid, dicamba, diuron, glyphosate, hexazinone, imazapic, imazapyr, methsulfuron methyl, picloram, sulfometuron methyl, triclopyr, fenoxaprop, fluazifop, quizalofop, clethodim, sethoxydim, chlorimuron, foramsulfuron, halosulfuron, nicosulfuron, primisulfuron, prosulfuron, rimsulfuron, thofensulfuron, tribenuron, imazamox, imazaquin, flumetsulam, cloransulam, thiencarbazone, fluoxpyr, diflufenzopyr, atrazine, simazine, metribuzin, bromoxynil, bentazon, linuron, glufosinate, clomazone, isoxaflutole, topramezone, mesotrione, tembotrione, acifluorfen, formesafen, lactofen, flumiclorac, flumioxazin, fulfentrazone, carfentrazone, fluthiacet-ethyl, falufenacil, paraquat, ethalfluralin, pendimethalin, trifluralin, butylate, EPTC, ecetochlor, alachlor, metolachlor, dimethenamid, flufenacet, and pyroxasulfone.

A pesticide is a substance meant to prevent, destroy, or control pests including, but not limited to algae, bacteria, fungi, plants, insects, mites, snails, rodents, and viruses.

A pesticide intended for use against algae is known as an algicide. Examples of algicides include benzalkonium chloride, bethoxazin, cybutryne, dichlone, dichlorophen, diuron, endothal, fentin, isoproturon, methabenthiazuron, nabam, oxyfluorfen, pentachlorophenyl laurate, quinoclamine, quinonamid, simazine, terbutryn, and tiodonium.

A pesticide intended for use against bacteria is known as a bactericide. Examples of bactericides include antibiotics such as aminoglycosides such as amikacin, gentamicin, kanamycin, neomycin, netilmicin, tobramycin, paromomycin, streptomycin, and spectinomycin; ansamycins such as geldanamycin, herbimycin, and rifaximin; carbacephems such as loracarbef; carbapenems such as ertapenem, doripenem, imipenem, and meropenem; cephalosporins such as cefadroxil, cefazolin, cephradine, cephapirin, cephalothin, cephalexin, cefaclor, cefoxitin, cefotetan, cefamandole, cefmetazole, cefonicid, cefprozil, cefuroxime, cefixime, cefdinir, cefditoren, cefoperazone, cefotaxime, cefpodoxime, cefazidime, ceftibuten, ceftizoxime, moxalactam, ceftriaxone, cefepime, cefaroline fosamil, and ceftobiprole; glycopeptides such as teicoplanin, vancomycin, telavancin, dalbavancin, and oritavancin; lincosamides such as clindamycin and lincomycin; lipopeptides such as daptomycin; macrolides such as azithromycin, clarithromycin, erythromycin, roxithromycin, telithromycin, spiramycin, and fidoxamicin; monobactams such as aztreonam; nitrofurans such as furazolidone and nitrofurantoin; oxazolidinones such as linezolid, posizolid, radezolid, and torezolid; penicillins such as amoxicillin, ampicillin, azlocillin, dicloxacillin, flucloxacillin, mezlocillin, methicillin, nafcillin, oxacillin, penicillins (including penicillin G and V), piperacillin, temocillin, and ticarcillin; polypeptides such as bacitracin, colistin, and polymyxin B; quinolones such as ciprofloxacin, enoxacin, gatifloxacin, gemifloxacin, levofloxacin, lomefloxacin, moxifloxacin, nadifloxacin, nalidixic acid, norfloxacin, ofloxacin, trovafloxacin, gepafloxacin, sparfloxacin, and temafloxacin; sulfonamides such as mafenide, sulfacetamide, sulfadiazine, sulfadithoxine, sulfamethizole, sulfamethoxazole, sulfanilamide, sulfasalazine, sulfisoxazole, and sulfonamidochrysoidine; tetracyclines such as demeclocycline, doxycycline, metacycline, minocycline, oxytetracycline, and tetracycline.

A pesticide intended for use against fungi is known as a fungicide. Examples of fungicides include acibenzolar, acypetacs, aldimorph, anilazine, aureofungin, azaconazole, azithiram, azoxystrobin, benalaxyl, benodanil, benomyl, benquinox, benthiavalicarb, binapacryl, biphenyl, bitertanol, bixafen, blasticidin-S, boscalid, bromuconazole, captafol, captan, carbendazim, carboxin, carpropamid, chloroneb, chlorothalonil, chlozolinate, cyazofamid, cymoxanil, cyprodinil, dichlofluanid, diclocymet, dicloran, diethofencarb, difenoconazole, diflumetorim, dimethachlone, dimethomorph, diniconazole, dinocap, dodemorph, edifenphos, enoxastrobin, epoxiconazole, etaconazole, ethaboxam, ethirimol, etridazole, famoxadone, fenamidone, fenarimol, fenbuconazole, fenfuram, fenhexamid, fenoxanil, fenpropidin, fenpropimorph, ferbam, fluazinam, fludioxonil, flumorph, fluopicolide, fluopyram, fluoroimide, fluoxastrobin, flusilazole, flutianil, flutolain, flopet, fthalide, furalaxyl, guazatine, hexaconazole, hymexazole, imazalil, imibenconazole, iminoctadine, iodocarb, ipconazole, iprobenfos, iprodione, iprovalicarb, siofetamid, isoprothiolane, isotianil, kasugamycin, laminarin, mancozeb, mandestrobin, mandipropamid, maneb, mepanypyrim, mepronil, meptyldinocap, mealaxyl, metominostrobin, metconazole, methafulfocarb, metiram, metrafenone, myclobutanil, naftifine, nuarimol, octhilinone, ofurace, orysastrobin, oxadixyl, oxathiapirolin, oxolinic acid, oxpoconazole, oxycarboxin, oxytetracycline, pefurazate, penconazole, pencycuron, penflufen, penthiopyrad, phenamacril, picarbutrazox, picoxystrobin, piperalin, polyoxin, probenzole, prochloraz, procymidone, propamocarb, propiconazole, propineb, proquinazid, prothiocarb, prothioconazole, pydiflumetofen, pyraclostrobin, pyrametostrobin, pyraoxystrobin, pyrazophos, pyribencarb, pyributicarb, pyrifenox, pyrimethanil, pyrimorph, pyriofenone, pyroquilon, quinoxyfen, quintozene, sedaxane, silthiofam, simeconazole, spiroxamine, streptomycin, tebuconazole, tebufloquin, teclofthalam, tecnazene, terbinafine, tetraconazole, thiabendazole, thifluzamide, thiphanate, thiram, tiadinil, tolclosfos-methyl, folfenpyrid, tolprocarb, tolylfluanid, triadimefon, triadimenol, triazoxide, triclopyricarb, tricyclazole, tridemorph, trifloxystrobin, triflumizole, triforine, validamycin, and vinclozolin.

A pesticide intended for use against plants is known as a herbicide as described above.

A pesticide intended for use against insects is known as an insecticide. Examples of insecticides are: organochlorides such as Aldrin, chlordane, chlordecone, DDT, dieldrin, endofulfan, endrin, heptachlor, hexachlorobenzene, lindane, methoxychlor, mirex, pentachlorophenol, and TDE; organophosphates such as acephate, azinphos-methyl, bensulide, chlorethoxyfos, chlorpyrifos, diazinon, chlorvos, dicrotophos, dimethoate, disulfoton, ethoprop, fenamiphos, fenitrothion, fenthion, malathion, methamdophos, methidathion, mevinphos, monocrotophos, naled, omethoate, oxydemeton-methyl, parathion, phorate, phosalone, phosmet, phostebupirim, phoxim, pirimiphos-methyl, profenofos, terbufos, and trichlorfon; carbamates such as aldicarb, bendiocarb, carbofuran, carbaryl, dioxacarb, fenobucarb, fenoxycarb, isoprocarb, methomyl; pyrethroids such as allethrin, bifenthrin, cyhalothrin, cypermethrin, cyfluthrin, deltamethrin, etofenprox, fenvalerate, permethrin, phenothrin, prallethrin, resmethrin, tetramethrin, tralomethrin, and transfluthrin; neonicotinoids such as acetamiprid, clothiandin, imidacloprid, nithiazine, thiacloprid, and thiamethoxam; ryanoids such as chlorantraniliprole, cyanthaniliprole, and flubendiamide.

A pesticide intended for use against mites is known as a miticide. Examples of miticides are permethrin, ivermectin, carbamate insecticides as described above, organophosphate insecticides as described above, dicofol, abamectin, chlorfenapyr, cypermethrin, etoxazole, hexythiazox, imidacloprid, propargite, and spirotetramat.

A pesticide intended for use against snails and other mollusks is known as a molluscicide. Examples of molluscicides are metaldehyde and methiocarb.

A pesticide intended for use against rodents is known as a rodenticide. Examples of rodenticides are warfarin, coumatetralyl, difenacoum, brodifacoum, flocoumafen, bromadiolone, diphacinone, chlorophacinone, pindone, difethialone, cholecalciferol, ergocalciferol, ANTU, chloralose, crimidine, 1,3-difluoro-2-propanol, endrin, fluroacetamide, phosacetim, pyrinuron, scilliroside, strychnine, tetramethylenedisulfotetramine, bromethalin, 2,4-dinitrophenol, and uragan D2.

A pesticide intended for use against viruses is known as a virucide. Examples of virucides are cyanovirin-N, griffithsin, interferon, NVC-422, scytovirin, urumin, virkon, zonroz, and V-bind viricie.

The contaminant may include a pharmaceutical contaminant. Suitable examples may include, but are not limited to, CTTC, oxytetracycline (OTC), sulfadiazine, ciprofloxacin, erythromycin, streptomycin, amoxicillin, tylosin, penicillin g, doxycycline, ceftriaxone, cefuroxime, chloramphenicol, levofloxacin, trimethoprim, sulfamethoxazole, clarithromycin, moxifloxacin, norfloxacin, lincomycin, tetracycline, rifampicin, ofloxacin, gentamicin, enrofloxacin, ceftazidime, azithromycin, vancomycin, clindamycin, florfenicol, ceftiofur, tiamulin, quinolones, ampicillin, bacitracin, metronidazole, rifaximin, furazolidone, colistin, polymyxin b, fucidic acid, cephalexin, cloxacillin, methylene blue, tigecycline, cefotaxime, nafcillin, ticarcillin, telithromycin, spectinomycin, fusidic acid, norfloxacin, neomycin, erythromycin ethylsuccinate, quinupristin, dalfopristin, linezolid, amikacin, imipenem, meropenem, doripenem, piperacillin, trimethoprim-sulfamethoxazole, pristinamycin, teicoplanin, cefdinir, cefepime, minocycline, carbapenems, gentamicin sulfate, clindamycin phosphate, nitroxoline, methicillin, caspofungin, polymyxin e, teicoplanin, amoxicillin-clavulanate, oxacillin, rifabutin, trimethoprim-sulfamethoxazole, nalidixic acid, furaltadone, levamisole, erythromycin lactobionate, vancomycin hydrochloride, roxithromycin, oxolinic acid, paromomycin, clarithromycin, oxytetracycline HCl, amikacin sulfate, cefoperazone, flumequine, amphenicols, leucomycin, sulfaquinoxaline, sulfamethazine, carbenicillin, aztreonam, ceftobiprole, ceftaroline, furazolidone, ampicillin-sulbactam, piperacillin-tazobactam, temocillin, mupirocin, colistimethate sodium, moxalactam, ropivacaine, lincosamide, linezolid, ticarcillin-clavulanate, lefamulin, bacitracin zinc, isavuconazonium sulfate, cefpodoxime, fosfomycin, chlortetracycline hydrochloride, penicillin v potassium, chloramphenicol sodium succinate, ampicillin trihydrate, ticarcillin sodium, erythromycin stearate, thiamphenicol, trimetoprim-sulfamethoxazole, cefoxitin, cefixime, cefoperazone sodium, nifuroxazide, paromomycin sulfate, daptomycin, fusafungine, monensin, balofloxacin, meticillan, nystatin, nitrofural, trimethoprim, oxytetracycline acetate, ceftazidime-avibactam, albendazole, clarithromycin phosphate, piperacillin/tazobactam, teicoplanin sodium, fidaxomicin, lefamulin acetate, liraglutide, tigecycline, chloroquine, sparfloxacin, valnemulin, trimethoprim, gentamicin sulfate, doxycycline hyclate, mupirocin ointment, cefpiramide, cloxacillin sodium, imipenem-cilastatin, monobactams, azithromycin, methylthioninium chloride, chlorhexidine, amikacin sulfate, ceftriaxone sodium, benzylpenicillin, ceftazidime, moxifloxacin hydrochloride, phenoxymethylpenicillin, rifapentine, chloromycetin, rifabutin, penicillin v, lomefloxacin, oxytetracycline hcl, nelfinavir, acetylspiramycin, amoxicillin trihydrate, ticarcillin, polymyxin e sulfate, amphotericin b, nystatin, cephalothin sodium, gentamicin sulfate, betamethasone, chloramphenicol succinate, pivmecillinam, nalidixic acid, hydroxychloroquine, amoxicillin/clavulanate potassium, furosemide, temocillin, benzylpenicillin, ceftizoxime, cefdinir, daptomycin sodium, methicillin sodium, thiamphenicol, cephradine, ceftobiprole, rifamycin, rifampin, mupirocin, streptogramins, fidaxomicin, sulfasalazine, cefepime, penicillin g, imidazole, cefotaxime sodium, rifaximin, nitrofurantoin, sulfadoxine, nitisinone, neomycin sulfate, doxycycline monohydrate, piperacillin, tazobactam, isoniazid, capreomycin, cephalexin, and trimethoprim-sulfamethoxazole.

As used herein, the term 'wet phase inversion process' refers to a membrane fabrication technique in which a casting solution containing a polymer is dissolved in a solvent and then exposed to a nonsolvent, leading to the formation of a solid polymer membrane. During this process, the polymer undergoes phase separation, transitioning from a liquid state to a solid state due to the exchange between solvent and nonsolvent, typically through immersion or spraying.

As used herein, the term 'casting solution' refers to a homogeneous mixture of a polymer dissolved in a solvent, which is prepared for the purpose of membrane formation. The solution is typically spread or cast onto a surface, where it will undergo phase inversion to form the desired membrane structure.

As used herein, the term 'solvent' refers to a liquid substance capable of dissolving a polymer to form a casting solution. Solvents used in membrane production are typically organic compounds that can dissolve high-molecular-weight polymers, and they are later removed during the phase inversion process to leave behind the solid polymer membrane.

As used herein, the term 'water flux rate' refers to the volume of water that passes through a membrane per unit of time, typically expressed as liters per square meter per hour ($L/m^2 \cdot h$). It is a performance metric that indicates the permeability of the membrane to water. The water flux rate is influenced by factors such as membrane porosity, thickness, pressure gradient, and the specific characteristics of the membrane material. A higher water flux rate signifies greater membrane efficiency in allowing water to pass through while retaining solutes or contaminants.

As used herein, the term 'contact angle' is the angle between a liquid surface and a solid surface where they meet. More specifically, it is the angle between the surface tangent on the liquid-vapor interface and the tangent on the solid-liquid interface at their intersection. Generally, if the water contact angle is smaller than 90 degree (°), the solid surface is considered hydrophilic and if the water contact angle is larger than 90°, the solid surface is considered hydrophobic.

As used herein, the term 'interfacial polymerization process' refers to a method of polymer synthesis in which two monomers react at the interface of two immiscible solvents (usually aqueous and organic phases). One monomer is dissolved in the aqueous phase, and the other is dissolved in the organic phase. Upon contact at the interface, the monomers react to form a polymer.

As used herein, the term 'rejection rate' refers to the efficiency of a filtration or separation process in rejecting or removing specific substances (e.g., solutes, contaminants, particles) from a mixture. It is typically expressed as a percentage of the amount of a particular substance that is removed compared to the total amount present in the feed solution. A higher rejection rate indicates better performance in separating the desired components from the undesired ones.

As used herein, the term 'contaminated water sources' may include sea water, river water, lake water, groundwater, industrial waste water, municipal waste water, stormwater runoff, agricultural runoff, landfill leachate, mining effluent, polluted wells, sewage water, chemical plant effluent, oil-contaminated water, heavy metal-laden water, hospital wastewater, toxic water from manufacturing processes, silt-laden water, and urban runoff.

Aspects of the present disclosure relate to high flux nanofiltration (NF) membranes engineered to efficiently reject salts and contaminants from various water sources. The present disclosure involves the modification of a polysulfone support layer by incorporating hydrophobic diamines, such as 2-chloro-4,6-diamino-1,3,5-triazine (DA1), benzoguanamine (DA2), and acetoguanamine (DA3), into the polysulfone casting solution prior to the phase inversion process. This modification enhances the structural and surface properties of the membrane, thereby improving its performance with respect to both water flux and the rejection efficiency of salts and pharmaceutical drugs.

Techniques herein provide a membrane that includes a base layer. The membrane includes a support layer formed on the base layer, and the support layer includes polysulfone (Psf), polyvinylpyrrolidone (PVP) and at least one diamine selected from 2-chloro-4,6-diamino-1,3,5-triazine, benzoguanamine, and acetoguanamine.

Based on a total weight of the support layer, the Psf can have a concentration of 60-97 wt. % e.g. 60 wt. %, 65 wt. %, 70 wt. %, 80 wt. %, 90 wt. %, 95 wt. %, 97 wt. % or any values therebetween. Based on the total weight of the support layer, the PVP can have a concentration of 1-35 wt. %, e.g. 1 wt. %, 3 wt. %, 5 wt. %, 10 wt. %, 15 wt. %, 20 wt. %, 30 wt. %, 35 wt. % or any values therebetween. Based on the total weight of the support layer, the at least one diamine can have a concentration of 0.02-5 wt. %, e.g. 0.02 wt. %, 0.03 wt. %, 0.05 wt. %, 0.10 wt. %, 0.15 wt. %, 0.20 wt. %, 0.30 wt. %, 0.45 wt. %, 0.50 wt. % or any values therebetween. Preferably based on the total weight of the support layer, the Psf, the PVP and the at least one diamine respectively have a concentration of 85-96 wt. %, 4-15 wt. % and 0.20-0.50 wt. %.

Since the Psf can have a concentration of 60-97 wt. %, and the PVP can have a concentration of 1-35 wt. %, based on the total weight of the support layer, the Psf is a major component and can form a polymeric matrix of the support layer where the PVP and the at least one diamine are distributed. Alternatively, the PSf and the PVP may form a polymeric matrix of the support layer where the at least one diamine is distributed.

In some embodiments, the at least one diamine may include an additional amine that includes, but is not limited to, 1,4-diaminobenzene, p-phenylenediamine, m-phenylenediamine, 4,4'-methylenedianiline, 2,4-diaminotoluene, 3,5-diaminobenzoic acid, 1,3-diamino-2-hydroxypropane, diamino-pyridine, 2,5-diamino-1,4-benzene, 4,6-diamino-1, 3,5-triazine, 1,2-diaminocyclohexane, 1,3-diaminocyclohexane, 2,3-diaminopyridine, 2,5-diaminobenzene, 3,4-diaminophenylmethane, 1,4-diamino-2,3-dihydroxybutane, N,N'-bis(3-aminopropyl)ethylenediamine, 1,6-diaminohexane, 1,3-bis(aminomethyl)benzene, 4,6-diaminopyrimidine, 3,3'-diaminobenzidine, 2,6-diaminopyridine, 1,5-diaminopentane, 1,4-diamino-2,3-dihydroxypropane, 1,3-bis (aminomethyl)cyclohexane, 2,6-diamino-4-methylpyridine, 2-amino-4-methylpyridine, 1,3-diamino-4-methylpentane, 2,3-diaminobenzene, 1,4-diaminocyclohexene, 2,4-diaminobenzene, 3,4-diaminobenzophenone, 4,4'-diaminodiphenylmethane, 1,3-diamino-2-methylpropane, 4-aminophenylhydrazine, 1,3-diaminobutene, 3,4-diaminobenzophenone, 4-aminobenzylamine, 2,5-diamino-3-methylpyridine, N-(2-aminoethyl)cyclohexanamine, 2,3-diaminocyclohexane, 3,4-diamino-1,2,5-thiadiazole, 2,6-diamino-3-methylpyridine, 1,3-diamino-5-methylbenzene, 4,6-diaminoquinazoline, 1,2-diaminocycloheptane, 2,4-diamino-1,3-dioxane, 2,3-diamino-4-nitropyridine, 1,4-diamino-2-phenylbutane, 1,3-diamino-4-chlorobenzene, 2-amino-1,3-dimethylbenzene or any combinations thereof.

The additional amine can have a concentration that is 0-30%, preferably 5%-25%, preferably 10%-20%, of the concentration of the at least one amine.

The support layer may include an additional polymer including, but not limited to, polyethersulfone (PES), polyamide (PA), polypropylene (PP), polytetrafluoroethylene (PTFE), polyvinylidene fluoride (PVDF), polyethylene (PE), polycarbonate (PC), cellulose acetate (CA), polylactic acid (PLA), polyimide (PI), polystyrene (PS), polyurethane (PU), polymethyl methacrylate (PMMA), polyvinyl chloride (PVC), polyethylene terephthalate (PET), polybutylene terephthalate (PBT), polybutadiene (PBD), polycaprolactone (PCL), polypropylene glycol (PPG), polymethylpentene (PMP), polytrifluorochloroethylene (PTFCE), polyglycolide (PGA), polyoxymethylene (POM), poly(N-vinylcarbazole) (PVK), poly(butylene succinate) (PBS), polyphenylene sulfide (PPS), polyacrylonitrile (PAN), polyetherimide (PEI), polyphenylene oxide (PPO), polylactide (PLLA), polyetherketone (PEK), polyetherketoneketone (PEKK), polyphthalamide (PPA), polyamide-imide (PAI), polyphosphazene (PPZ), poly(2-hydroxyethyl methacrylate) (PHEMA), poly(ethyl acrylate) (PEA), poly(benzimidazole-co-benzoxazole) (PBIB), poly(ethylene glycol) (PEG), polycaprolactam (nylon 6) (N6), polyethylene naphthalate (PEN), polydicyclopentadiene (PDCPD), poly(propylene carbonate) (PPC), polyvinylnitrile (PVN), poly(diallyldimethylammonium chloride) (PDADMAC), polybenzoxazine (PBZ), polysiloxane (PSX), polysulphone (PSSU), polyvinylpyridine (PVPy), polyisoprene (PI), polybisphenol-A polycarbonate (BPA-PC), polyphenylene (PP), poly(ethyl methacrylate-co-butyl acrylate) (PEMABA), poly(ethylene-co-vinyl acetate) (EVA), poly(trimethylene terephthalate) (PTT), poly(ethylene-co-acrylic acid) (PEAA), polyvinylenefluoride (PVF), polystyrene-b-polybutadiene-b-polystyrene (SBS), polyimide (PI), poly(phenylene vinylene) (PPV), polytetrafluoroethylene (PTFE), poly(butyl methacrylate) (PBMA), poly(ethylene glycol) dimethyl ether (PEG-DME), poly(vinyl acetate) (PVA), polyurethane (PU), poly(methyl methacrylate-co-acrylonitrile) (PMMA-Co-AN), poly(trimethylsiloxy) (PTS), poly(butyl acrylate) (PBA), poly(vinyl alcohol) (PVA), polyethyl methacrylate (PEMA), polyacrylate (PA), poly(ethyl methacrylate) (PEMA), polycyclohexylenedimethylene terephthalate (PCT), poly(ethylene-co-methyl acrylate) (PEMA), polycaprolactone (PCL), polyoxymethylene (POM), polyphenylene oxide (PPO) or any combinations thereof. The additional polymer can have a concentration of 0-15 wt. %, preferably 1-10 wt. %, preferably 3-5 wt. %, based on the total weight of the support layer.

In some embodiments, the support layer of the membrane is obtained by executing a wet phase inversion process using a casting solution including Psf, PVP, and the at least one diamine. In some embodiments, the casting solution is obtained by dissolving Psf, PVP and the at least one diamine in a solvent including N,N-dimethylacetamide (DMAC) at a temperature of 60° C. to 100° C., preferably 60° C. to 95° C., preferably 62° C. to 90° C., preferably 65° C. to 85° C., preferably 70° C. to 80° C., preferably 72° C. to 78° C., preferably 74° C. to 76° C., preferably 75° C., preferably 76° C. to 85° C., preferably 78° C. to 84° C., preferably 79° C. to 83° C., preferably 80° C. In some embodiments, the DMAC has a concentration of 70-100 wt. %, preferably 80-95 wt. %, preferably 85-90 wt. % based on a total weight of the solvent. Alternatively or additionally, the solvent may include, but are not limited to, N,N-dimethylformamide (DMF), acetone, tetrahydrofuran (THF), chloroform, cyclohexanone, dimethyl sulfoxide (DMSO), ethanol, methanol, isopropyl alcohol (IPA), toluene, hexafluoroisopropanol (HFIP), 1-methyl-2-pyrrolidone (NMP), dichloromethane (DCM), methyl ethyl ketone (MEK), formic acid, benzene, pyridine, water (for hydrophilic polymer membranes), ether (e.g., diethyl ether), acetonitrile or any combinations thereof.

In some embodiments, the support layer is obtained by executing the wet phase inversion process of the casting solution on the base layer including a nonwoven polyether terephthalate (PET) layer that is pre-saturated with DMAC for example by soaking the base layer in DMAC for 5 minutes to 24 hours, preferably 30 minutes to 12 hours, preferably 1 hour to 4 hours. The purpose of pre-saturation is to prevent the solvent (DMAC) from migrating or penetrating the support layer. By pre-saturating the PET layer, the interaction between the casting solution and the support layer is controlled, ensuring a stable, uniform formation of a polyamide layer on the support layer of the membrane.

The polyamide layer has repeating units derived from a diamine such as piperazine and repeating units derived from a multi-acyl chloride such as trimesoylchloride. The repeating units derived from piperazine and the repeating units derived from trimesoylchloride can have a combined concentration of 70-100 wt. %, preferably 80-95 wt. %, preferably 85-95 wt. % based on a total weight of the polyamide layer. Additionally, the diamine may include m-phenylenediamine (MPD), p-phenylenediamine (PPD), 1,4-diaminobenzene, 2,6-diaminopyridine, 1,6-diaminohexane, 1,4-diaminobutane, 1,3-diaminopropane, N,N'-bis(3-aminopropyl)ethylenediamine, 4,4'-methylenedianiline, 1,2-diaminocyclohexane,1,3-diaminocyclohexane, or any combinations thereof. Additionally, the multi-acyl chloride may include terephthaloyl chloride (TDC), isophthaloyl chloride (IPC), terephthaloyl chloride, terephthaloyl chloride, sebacoyl chloride, adipoyl chloride, dodecanedioyl chloride, suberoyl chloride, isophthaloyl chloride, terephthaloyl chloride, phthaloyl chloride, or any combinations thereof. For instance, the polyamide layer may include combinations such as m-phenylenediamine (MPD) with terephthaloyl chloride (TDC), p-phenylenediamine (PPD) with isophthaloyl chloride (IPC), 1,4-diaminobenzene with terephthaloyl chloride, 2,6-diaminopyridine with terephthaloyl chloride, 1,6-diaminohexane with sebacoyl chloride, 1,4-diaminobutane with adipoyl chloride, 1,3-diaminopropane with dodecanedioyl chloride, N,N'-bis(3-aminopropyl) ethylenediamine with suberoyl chloride, 4,4'-methylenedianiline with isophthaloyl chloride, 1,2-diaminocyclohexane with terephthaloyl chloride, and 1,3-diaminocyclohexane with phthaloyl chloride.

As mentioned earlier in some embodiments, the at least one diamine may be distributed in a polymeric matrix of the support layer formed by the Psf (and possibly the PVP). The polymeric matrix may be in the form of a three-dimensional (3D) network having pores formed therein e.g. around a top surface of the 3D network facing the polyamide layer. At least some molecules of the at least one diamine can be present in the pores and react with the polyamide. As a result, the polyamide can be covalently bonded to the at least some molecules of the at least one diamine in the support layer via an amide bond and extends into pores of the support layer. When the pores are present around the top surface of the 3D network, the polyamide can extend into the polymeric matrix of the support layer by a depth of 0.5-10 nm e.g. 0.5 nm, 1 nm, 2 nm, 2.5 nm, 5 nm, 7.5, 10 nm or any values therebetween. Accordingly, chains of the polyamide can be locked into and entangled with the polymeric matrix of the support layer by the depth.

In some embodiments, the polyamide layer of the membrane includes globules on a surface of the polyamide layer, and the globules have an average size of 100 nanometres (nm) to 1000 nm, preferably 100 to 900 nm, preferably 110 to 850 nm, preferably 120 to 800 nm, preferably 130 to 750 nm, preferably 140 to 700 nm, preferably 150 to 650 nm, preferably 160 to 600 nm, preferably 170 to 550 nm, preferably 180 to 500 nm, preferably 190 to 450 nm, preferably 200 to 400 nm, preferably 210 to 350 nm, preferably 220 to 300 nm, preferably 230 to 250 nm, preferably 240 to 260 nm, preferably 250 to 270 nm, preferably 260 to 280 nm, preferably 270 to 290 nm, preferably 280 to 300 nm, preferably 290 to 310 nm, preferably 300 to 350 nm, preferably 310 to 360 nm, preferably 320 to 370 nm, preferably 330 to 380 nm, preferably 340 to 390 nm, preferably 350 to 400 nm, preferably 400 to 450 nm, preferably 450 to 500 nm, preferably 500 to 550 nm, preferably 550 to 600 nm, preferably 600 to 650 nm, preferably 650 to 700 nm, preferably 700 to 750 nm, preferably 750 to 800 nm, preferably 800 to 850 nm, preferably 850 to 900 nm, preferably 900 to 950 nm, preferably 950 to 1000 nm. Other morphologies that may be observed in the polyamide membrane may include pores, fingers, hollow structures, lamellar structures, microvoids, granular structures, networks, fibrous or nanofiber networks, and spongy or foam-like morphology.

In some embodiments, the casting solution used to form the support layer includes, based on a total weight of the casting solution, 10 weight percentage (wt. %) to 30 wt. %, preferably 10 to 28 wt. %, preferably 10.5 to 27.5 wt. %, preferably 11 to 26 wt. %, preferably 11.5 to 25.5 wt. %, preferably 12 to 25 wt. %, preferably 12.5 to 24.5 wt. %, preferably 13 to 24 wt. %, preferably 13.5 to 23.5 wt. %, preferably 14 to 23 wt. %, preferably 14.5 to 22.5 wt. %, preferably 15 to 22 wt. %, preferably 15.5 to 21.5 wt. %, preferably 16 to 21 wt. %, preferably 16.5 to 20.5 wt. %, preferably 17 to 20 wt. %, preferably 17.5 to 19.5 wt. %, preferably 18 wt. % Psf. The casting solution can include, based on the total weight of the casting solution, 0.5 wt. % to 5 wt. %, 0.5 to 4.5 wt. %, preferably 0.6 to 4.4 wt. %, preferably 0.7 to 4.3 wt. %, preferably 0.8 to 4.2 wt. %, preferably 0.9 to 4.1 wt. %, preferably 1 to 4 wt. %, preferably 1.1 to 3.9 wt. %, preferably 1.2 to 3.8 wt. %, preferably 1.3 to 3.7 wt. %, preferably 1.4 to 3.6 wt. %, preferably 1.5 to 3.5 wt. %, preferably 1.6 to 3.4 wt. %, preferably 1.7 to 3.3 wt. %, preferably 1.8 to 3.2 wt. %, preferably 1.9 to 3.1 wt. %, preferably 2 to 3 wt. %, preferably 2.1 to 2.9 wt. %, preferably 2.2 to 2.8 wt. %, preferably 2.3 to 2.7 wt. %, preferably 2.4 to 2.6 wt. %, preferably 2.5 wt. %, preferably 2 wt. %, of PVP. The casting solution can include, based on the total weight of the casting solution, 0.01 wt. % to 0.5 wt. % preferably 0.01 to 0.45 wt. %, preferably 0.02 to 0.4 wt. %, preferably 0.03 to 0.35 wt. %, preferably 0.04 to 0.3 wt. %, preferably 0.05 wt. %, preferably 0.06 to 0.2 wt. %, preferably 0.07 to 0.15 wt. %, preferably 0.08 to 0.1 wt. %, preferably 0.09 to 0.1 wt. %, preferably 0.1 wt. % of the at least one diamine. Preferably, the casting solution used to form the support layer includes, based on the total weight of the casting solution, 18 wt. % of Psf, 2 wt. % of PVP, and 0.05 wt. % to 0.1 wt. % of the at least one diamine.

In some embodiments, molecules of the at least one diamine are homogeneously distributed in the support layer to ensure uniform interaction with the polymer matrix, promoting consistent membrane performance. This distribution enhances the structural integrity, permeability, and selectivity of the membrane, while also improving fouling resistance and mechanical stability. The even dispersion of diamine molecules minimizes the formation of defects, ensuring reliable and efficient membrane operation.

In some embodiments, the polyamide layer is obtained by executing an interfacial polymerization process of a first solution including piperazine and a second solution including trimesoylchloride. Based on a total weight of the first solution, the first solution can include 0.5-5 wt. %, preferably 1-4 wt. %, prefer 2-3 wt. % of piperazine; 1-8 wt. %, preferably 2-6 wt. %, preferably 3-5 wt. % of triethylamine; and 85-98.5 wt. %, preferably 88-95 wt. %, preferably 90-92 wt. % of water. Preferably, based on the total weight of the first solution, the first solution includes 2 wt. % of piperazine, 4 wt. % of triethylamine, and 94 wt. % of water. Based on a total weight of the second solution, the second solution can include 0.05-3 wt. %, preferably 0.1-2 wt. %, preferably 0.5-1 wt. % of trimesoylchloride; and 90-99.9 wt. %, 95-99 wt. %, preferably 96-97 wt. % of n-hexane. Preferably, based on the total weight of the second solution, the second solution includes 0.3 wt. % of trimesoylchloride and 99.7 wt. % of n-hexane.

In some embodiments, the execution of the interfacial polymerization process includes immersing the support layer into the first solution, removing the support layer from the first solution, dipping the support layer into the second solution, rinsing the support layer with n-hexane, and maintaining the support layer at a temperature of 50-90° C., preferably 60-80° C., preferably 65-75° C., for a duration of 5 minutes to 24 hours, preferably 30-12 hours, preferably 1 hour to 4 hours. Preferably, the temperature is 70° C., and the duration is 20 minutes.

Techniques herein provide a method of filtration. The method includes filtering a liquid mixture through the membrane. The liquid mixture includes water and at least one of a salt or an organic molecule. In some embodiments, the water may include tap water, hard water, fresh water, brine/salt water or any combinations thereof. The fresh water may include salts of sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In some embodiments, the organic molecule includes acetaminophen, sulfamethoxazole, lomefloxacin, ranolazine, diatrizoic acid, ibuprofen, paracetamol, doxycycline, ciprofloxacin, metformin, salicylic acid, clindamycin, ketoprofen, diazepam, amoxicillin, caffeine, carbamazepine, chloramphenicol, fluconazole, indomethacin, ketorolac, losartan, methotrexate, naproxen, sildenafil, tolbutamide, tramadol, fluoxetine, propranolol, prednisolone, hydrocodone, valproic acid, glibenclamide, celecoxib, simvastatin, lorazepam, metoprolol, azithromycin, penicillin, diclofenac, terbinafine, miconazole, risperidone, hydroxychloroquine, tacrolimus, famotidine, topiramate, clarithromycin, hydrochlorothiazide, cimetidine, loratadine, sitagliptin, or a combination thereof. In some embodiments, the organic molecule includes acetaminophen, sulfamethoxazole, lomefloxacin, ranolazine, diatrizoic acid, or a combination thereof.

In some embodiments, the at least one diamine is benzoguanamine, which is present in the casting solution at a concentration of 0.1 wt. % based on the total weight of the casting solution. The membrane exhibits a water flux rate of 95.4 liters per square meter per hour ($L \cdot m^{-2} \cdot h^{-1}$) at a feed pressure of 15 bar. A comparative membrane, which is the same as the membrane except without the at least one diamine, has a water flux rate of 25.8 $L \cdot m^{-2} \cdot h^{-1}$ at the feed pressure. In some embodiments, the membrane has an 85% reduction in surface roughness compared to the comparative membrane. In some embodiments, the membrane has a rejection rate of about 98% for ranolazine, and the comparative membrane has a rejection rate of about 50% for ranolazine. In some embodiments, the membrane has a rejection rate of about 51% for NaCl, while the comparative membrane has a rejection rate of about 41% for NaCl.

In some embodiments, the at least one diamine is 2-chloro-4,6-diamino-1,3,5-triazine which is present in the casting solution at a concentration of 0.05 wt. % based on the total weight of the casting solution, and the membrane has a rejection rate of 54.5% for acetaminophen, and a comparative membrane has a rejection rate of 25.8% for acetaminophen. In some embodiments, the membrane has a rejection rate of about 49% for NaCl and a water flux rate of 30.0 $L \cdot m^{-2} \cdot h^{-1}$ at a feed pressure of 15 bar, and the comparative membrane has a rejection rate of about 41% for NaCl and a water flux rate of 25.8 $L \cdot m^{-2} \cdot h^{-1}$ at the feed pressure.

EXAMPLES

The following examples demonstrate a high flux nanofiltration membrane. The examples are provided solely for illustration and are not to be construed as limitations of the present disclosure, as many variations thereof are possible without departing from the spirit and scope of the present disclosure.

Example 1: Materials

Figures 1A, 1B, 1C:
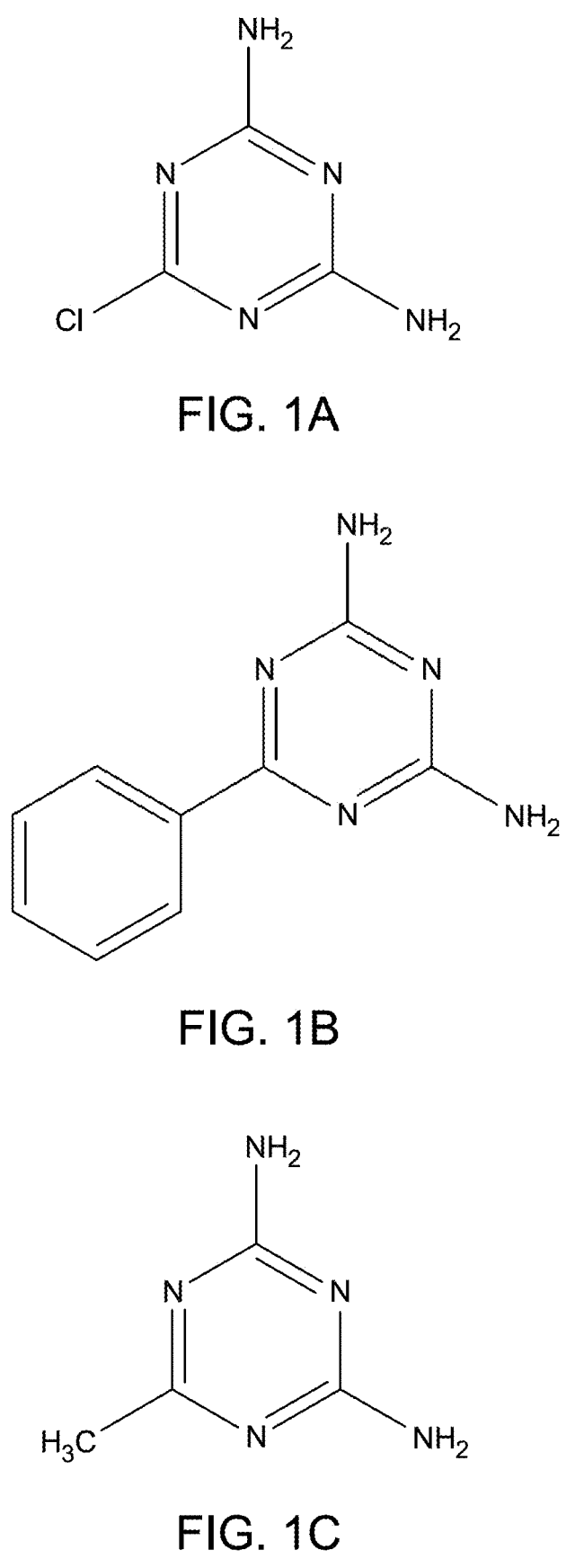

Polysulfone (Psf), triethylamine (TEA), piperazine (PIP), N,N-Dimethylacetamide (DMAC), sodium dodecyl sulphate (SDS), trimesoylchloride (TMC), n-hexane, 2-chloro-4,6-diamino-1,3,5-triazine (DA1), as shown in FIG. 1A, and polyvinylpyrrolidone (PVP) were acquired from Sigma Aldrich, USA. Polyethylene terephthalate (PET) was purchased from Freudenberg filtration technologies (Germany). A plurality of salts used for the filtration tests ($MgCl_2$, $MgSO_4$, $CaCl_2$, NaCl, $Na_2SO_4$) were obtained from Sigma Aldrich. Benzoguanamine (DA2), as shown in FIG. 1B, acetoguanamine (DA3), as shown in FIG. 1C, and the pharmaceutical drugs (acetaminophen, sulfamethoxazole, lomefloxacin, ranolazine, and diatrizoic acid) were acquired from TCI, Japan.

Example 2: Preparation of the Support Layer

According to the present disclosure, support layers of polysulfone were fabricated by a wet phase inversion technique, which involved converting a polymeric solution from one phase to another (liquid to solid) in a controlled manner. A polysulfone support layer was prepared by dissolving Psf (18 wt. %) and PVP (2 wt. %) (both previously dried at 80° C. in the oven) in DMAC solvent (80 wt. %) at a temperature of 80° C., while stirring until a viscous homogeneous solution was formed. The nonwoven fabric (PET) was uniformly saturated DM AC on a glass plate to prevent the penetration of DM AC from the casting solution to PET [S. Hermans, R. Bernstein, A. Volodin, I. F. J. Vankelecom, *Study of synthesis parameters and active layer morphology of interfacially polymerized polyamide-polysulfone membranes, React Funct Polym* 86 (2015) 199-208, incorporated herein by reference in its entirety]. The casting solution was then cast as a thin layer followed by submerging the entire assembly (including the glass plate, the PET and the thin layer) in a deionized (DI) water bath, where phase inversion took place immediately. The Psf/PET membrane was stored in DI water containing small amount of SDS for cleansing purposes. Two more support layers were prepared in a similar way, but with the dissolution of different masses (0.05 wt. % and 0.1 wt. %) of DA1 in the polysulfone casting solution, as shown in Table 1. The process was repeated for the other two diamines (DA2 and DA3) using the same concentrations as mentioned above. Further, the unmodified support was labelled as 'Psf WPA', referring to polysulfone-without polyamide. The modified supports were labelled as 'DAxCyWPA', where 'x' denoted as 1, 2, or 3 refers to 2-chloro-4,6-diamino-1,3,5-triazine, benzoguanamine, and acetoguanamine respectively. The 'y' denoted as 1 or 2 corresponds to 0.05 wt. % and 0.1 wt. %, respectively, and 'WPA' means 'without polyamide'.

TABLE 1

| Preparation conditions for Psf and diamine in polysulfone (DA) membranes. | | | | |
|---|---|---|---|---|
| | Casting solution (wt. %) | | | |
| Membrane | Psf | PVP | DMAC | Added diamine |
| PSF WPA | 18 | 2 | 80 | 0 |
| DA1C1WPA | 18 | 2 | 79.95 | 0.05 |
| DA1C2WPA | 18 | 2 | 79.9 | 0.1 |

Example 3: Fabrication of the Polyamide Active Layer

In certain aspects of the present disclosure, a polyamide active layer was formed over the surface of the PSF support by interfacial polymerization (IP) between PIP and TMC. The fabrication involved immersing the PSF/PET assembly into a 200 millilitres (mL) aqueous solution containing 2 wt. % of PIP and 4 wt. % of TEA and shaken in a see-saw manner for 10 minutes. Further, a rubber roller was used to remove excess of the aqueous solution. Furthermore, after leaving the membrane to dry for a predetermined time in ambient environment, the membrane was dipped in the 0.3 wt. % TMC in n-hexane solution, which initiated the IP reaction between PIP and TMC. Additionally, the membrane was rinsed with n-hexane for the removal of unreacted TMC. Moreover, in order to ensure the completion of the crosslinking reaction, the membrane was kept at 70° C. for 20 minutes before being stored again in deionized (DI) water. The foregoing experimental steps were applied to the modified membranes and the naming pattern was similar as described above with the addition of 'PA' (representing the polyamide formation) instead of 'WPA'.

Example 4: Characterization

A plurality of characterization techniques were utilized to characterize one or more properties associated with the membrane. In particular, attenuated total reflectance-Fourier transform infrared spectroscopy (ATR-FTIR) analysis was conducted using Thermo, Smart iTR NICOLET iS10 spectrometer, in order to verify the presence of one or more functional groups in the membrane. The surface morphology and roughness of the membrane were characterized using field emission scanning electron microscope (FESEM) using Thermo Fisher Quattro S unit, and atomic force microscope (AFM) (Agilent 5500, Netherland) respectively. Hydrophilicity of the support and active layers was evaluated using water contact angle (KRU SS DSA25). Zeta-potential measurements were conducted to examine the surface charge of the membranes using Anton Paar-Surpass 3, Austria.

Example 5: Filtration Tests and Analytical Analysis

The performance of membranes was evaluated using a crossflow filtration setup (Bona-TYLG-19 Shandong Bona Group, China). The membranes were compacted using DI water under a pressure of 25 bar for 30 minutes, followed by measuring the water flux using DI water as feed at different pressures. The operational pressure for the remaining tests was set at 15 bar. The filtration tests were conducted using five salts solutions (2000 mg L$^{-1}$) and five pharmaceutical products solutions (10 mg L$^{-1}$) in order to examine the permeated flux and rejection profile. The water flux (J) was calculated as per the equation provided below:

$$J = \frac{V}{At}, \tag{1}$$

where 'V' is the permeate volume in litres (L), 'A' is the active area of the membrane in square meters (m$^2$), and 't' refers to the time in hours (h) [M. E. A. Ali, Y. H. Kotp, R. Bosela, A. Samy, S. Awad, J. R. Du, *Enhancing the performance of TF C nanofiltration membranes by adding organic acids in polysulfone support layer, Polym Test* 91 (2020) 106775]. For salts testing, a total dissolved solids (TDS) meter was used to calculate the concentrations of the feed and permeate solutions. While the analytical analysis was conducted on the feed and permeate water from pharmaceutical products testing by HPLC coupled with a DAD detector. The rejection percent (R %) was calculated using the equation as provided below:

$$R\% = \left(1 - \frac{C_p}{C_f}\right) \times 100, \tag{2}$$

where 'C$_p$' and 'C$_f$' are the concentrations of the permeate and feed solutions, respectively.

Results

In general, polysulfone (Psf) support layers possess inherent hydrophobic characteristics. In view of this, three hydrophobic and water-insoluble diamines were selected for incorporation into the Psf support layer for illustrative purposes. The chemical structures of the three diamines are illustrated in FIGS. 1A-1C. The hydrophobic and water-insoluble nature of the three diamines rendered them homogeneously soluble in a casting solution including Psf and N,N-dimethylacetamide (DM AC), and effectively suppressing leaching thereof during the subsequent wet phase inversion process employed for support layer fabrication. Further, during phase inversion process, the three hydrophobic diamines distributed uniformly in or throughout the formed support layer. It is further proposed that a molecular orientation of the three diamines within the polysulfone matrix was such that the non-polar functional groups preferentially interacted with and anchored within the hydrophobic Psf matrix, while the polar amine groups extended outward towards the surface of the support layer, as conceptually illustrated in FIG. 2. The presence and specific chemistry of each of the selected diamines within the support layer was found to exert a substantial influence on the physical and chemical characteristics of the resultant support layer, including but not limited to porosity, surface roughness, polarity, and morphology of the support layer.

The aforesaid modifications in the physical and chemical attributes of the support layer were further found to directly affect the subsequent formation and characteristics of the overlying polyamide (PA) active layer formed atop the support layer. Accordingly, comprehensive characterizations were conducted to evaluate and compare the chemical and physical changes in both the diamine-modified support layers (WPA surfaces) and the corresponding PA layers formed thereon (PA surfaces). The characterizations included evaluation of morphology, analysis of chemical functional groups, assessment of surface hydrophilicity, and determination of surface charge characteristics.

The polyamide active layer was synthesized over the support layer using an interfacial polymerization reaction between piperazine (PIP) and trimesoyl chloride (TMC). In this reaction scheme, the acyl chloride groups of TMC were allowed to react both with the primary amine groups offered by the embedded hydrophobic diamines present in the support layer and the secondary amine groups provided by PIP. Such a dual interaction pathway was found to result in the formation of a distinctive polyamide active layer characterized by unique chemical compositions and physical features.

Extensive characterization studies were carried out to substantiate the proposed chemical and physical modifications arising from the incorporation of hydrophobic diamines into the support layer. The performance and characteristics of the diamine-modified membranes were systematically compared with those of a conventional unmodified polysulfone support membrane and a corresponding nanofiltration (NF) membrane formed under otherwise identical conditions. The characterization techniques applied included morphological analysis, chemical functional group analysis, surface hydrophilicity measurements, and evaluation of surface charge properties. The morphology of a support layer formed by phase inversion can be highly sensitive to various parameters, including the nature of the solvent employed in the precipitation bath and the composition of the polymer solution used in membrane casting. Variations in the above listed parameters, such as the molecular weight of the selected polymer, polymer concentration, or the addition of any modifiers or additives, may lead to significant changes in the resulting morphology of the support layer. Ultrafiltration membranes fabricated using the same amount of polysulfone may exhibit variations in structure and performance depending upon the specific conditions employed during the casting process, including temperature, humidity, and the molecular weight of the polysulfone polymer. In order to maintain uniformity and eliminate variability arising from commercial sources, all polysulfone membranes used in the present disclosure were fabricated under controlled conditions, rather than utilizing commercially available ultrafiltration membranes.

The surface microstructure of the PSF/PET (polysulfone/polyester) membranes fabricated in this manner was examined using field emission scanning electron microscopy (FESEM), as shown in FIGS. 3A-3G. The aforementioned evaluation was undertaken to confirm the formation of the polyamide active layer atop the membranes and to assess the influence of the selected diamines on the surface morphology. The FESEM micrographs revealed that the pristine PSF/PET membranes exhibited a uniformly porous structure. However, a clear and distinct alteration in the surface morphology was observed following the interfacial polymerization reaction between PIP and TMC, progressing from the WPA surfaces to the PA surfaces. The formation of the polyamide active layer was further corroborated by the observation of globular features on the membrane surface, which evidently indicates crosslinking between the monomeric units during interfacial polymerization. In the case of membranes modified with the first diamine (DA1), an increase in the concentration of diamine in the support layer led to a correspondingly higher density of typical polyamide globules on the membrane surface. In contrast, a different trend was observed in the case of support layers modified with the second (DA2) and third (DA3) diamines, where smoother surface morphologies were obtained with increasing diamine content.

The smoother morphology observed in the DA2 and DA3 modified supports was attributed to the presence of phenyl and methyl groups within the diamine structures. Based on established chemical principles and structural considerations, it was inferred that strong hydrophobic interactions might arise between the phenyl/methyl groups and the polysulfone matrix, leading to a more compact and less globular polyamide layer. Conversely, the chemical context applicable to DA1 was notably different. The presence of a chlorine atom within the DA1 structure was believed to impart significant electronegativity, resulting in a partial negative charge localized on the chlorine atom and a corresponding partial positive charge on the adjacent amine groups. The electronic configuration was proposed to reduce hydrophobic interactions between DA1 and the polysulfone matrix, thereby introducing a degree of randomness in the spatial arrangement of the polyamide layer, which manifested as an increase in globular surface features.

Figure 4A:
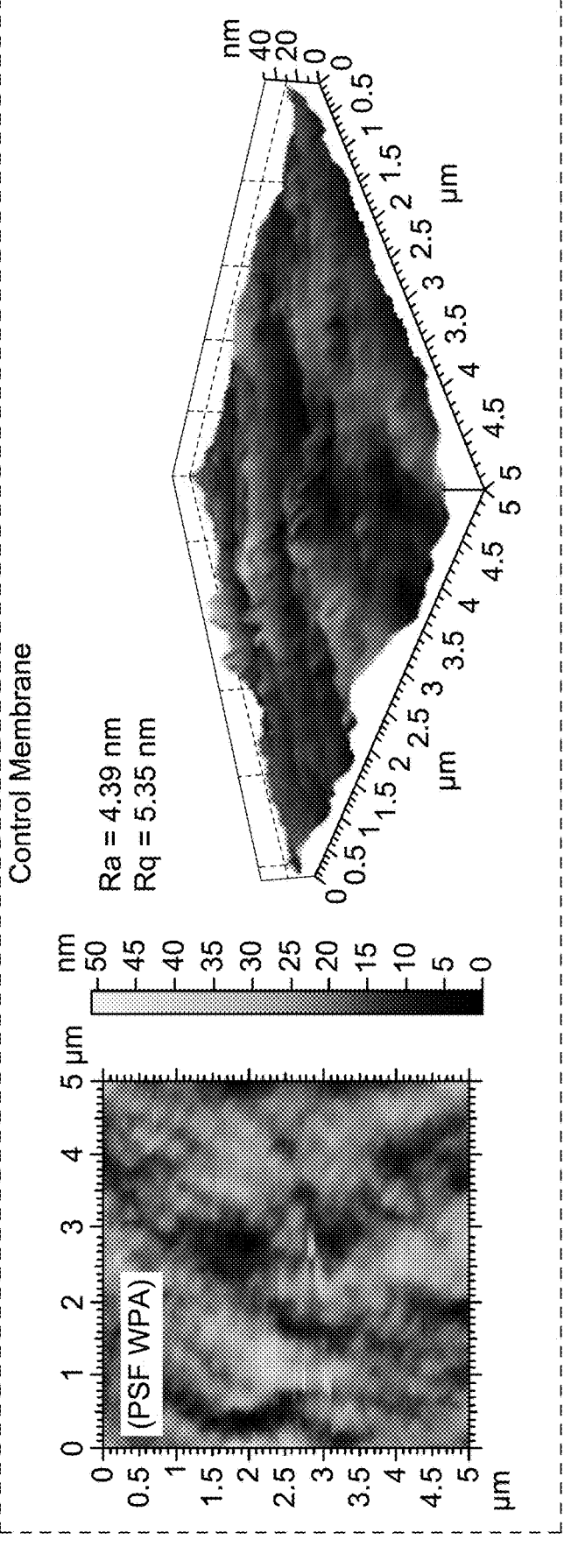
FIG. 4A depicts the atomic force microscopy (AFM) results for a control membrane having polysulfone support without polyamide, according to certain embodiments.
Figure 4B:
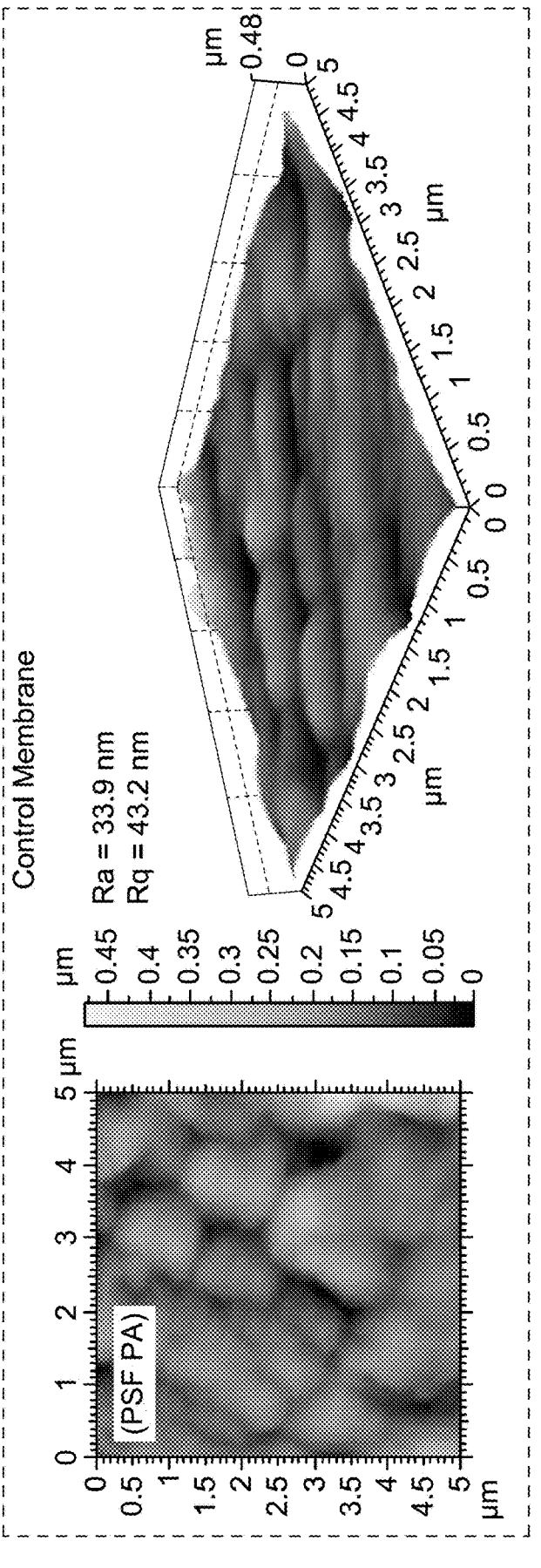
FIG. 4B depicts the AFM results for the control membrane having polysulfone support with polyamide, according to certain embodiments.
Figure 4C:
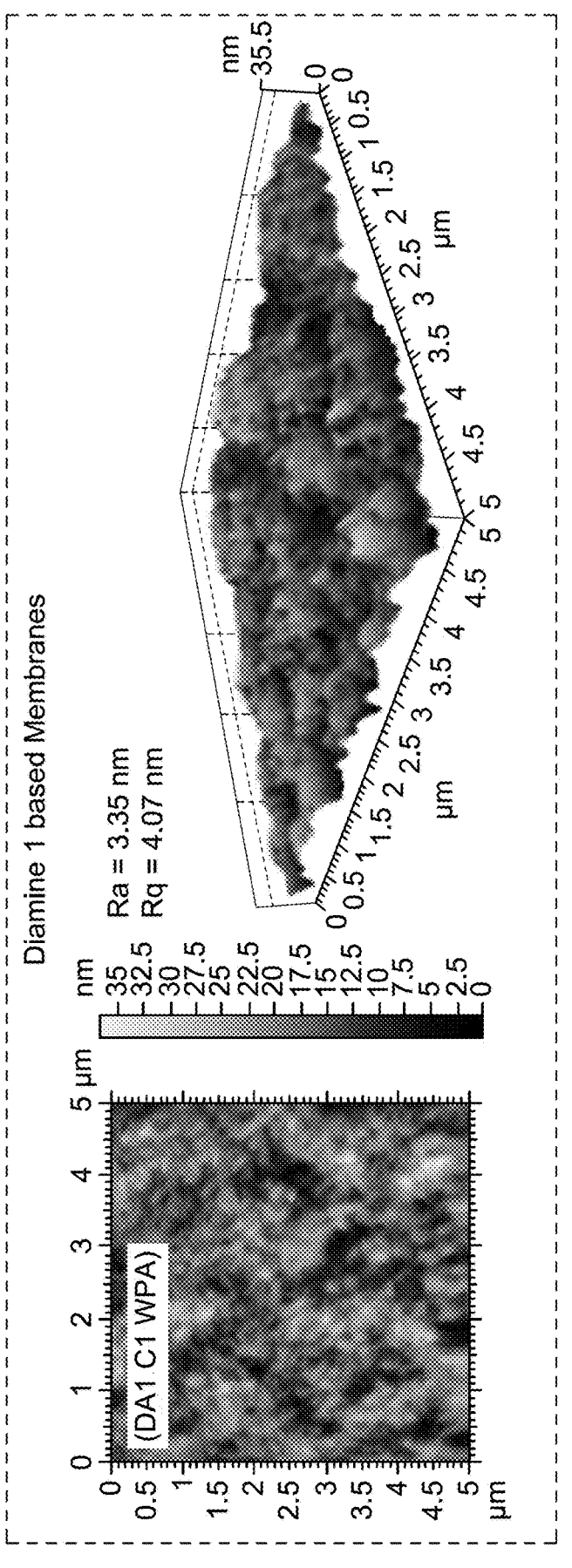
FIG. 4C depicts the AFM results for the DA1 membrane without polyamide, at the concentration 'C1', according to certain embodiments.
Figure 4D:
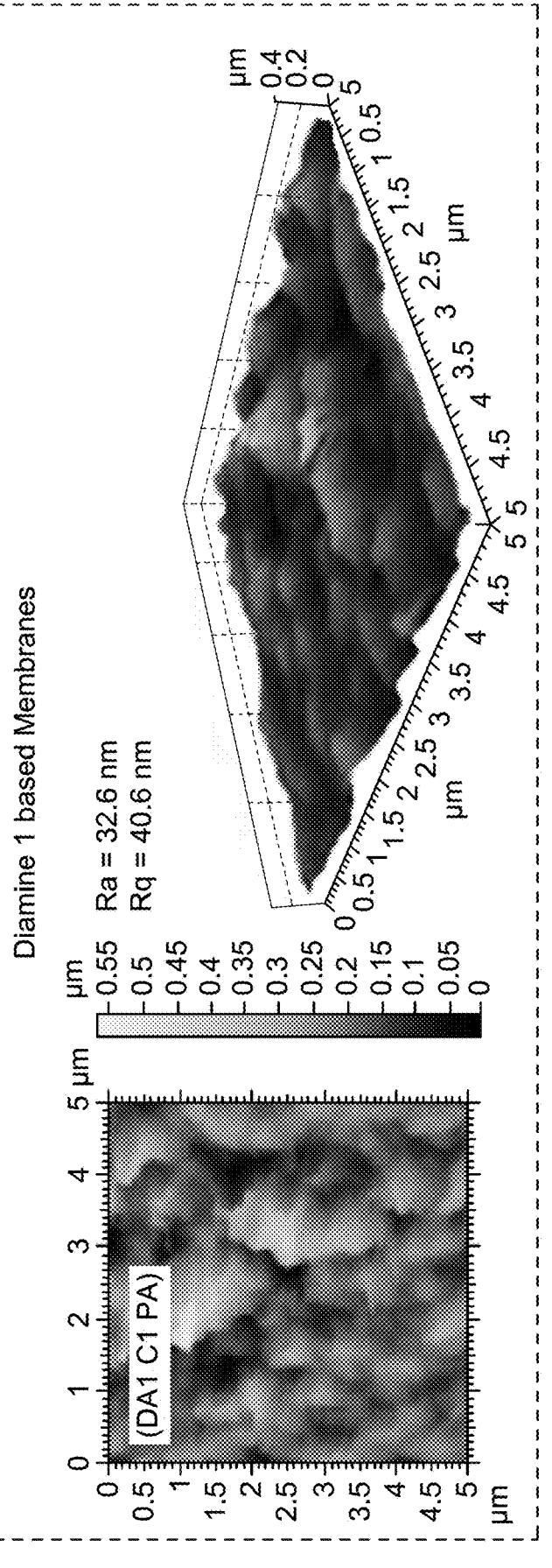
FIG. 4D depicts the AFM results for the DA1 membrane with polyamide, at the concentration 'C1', according to certain embodiments.
Figure 4E:
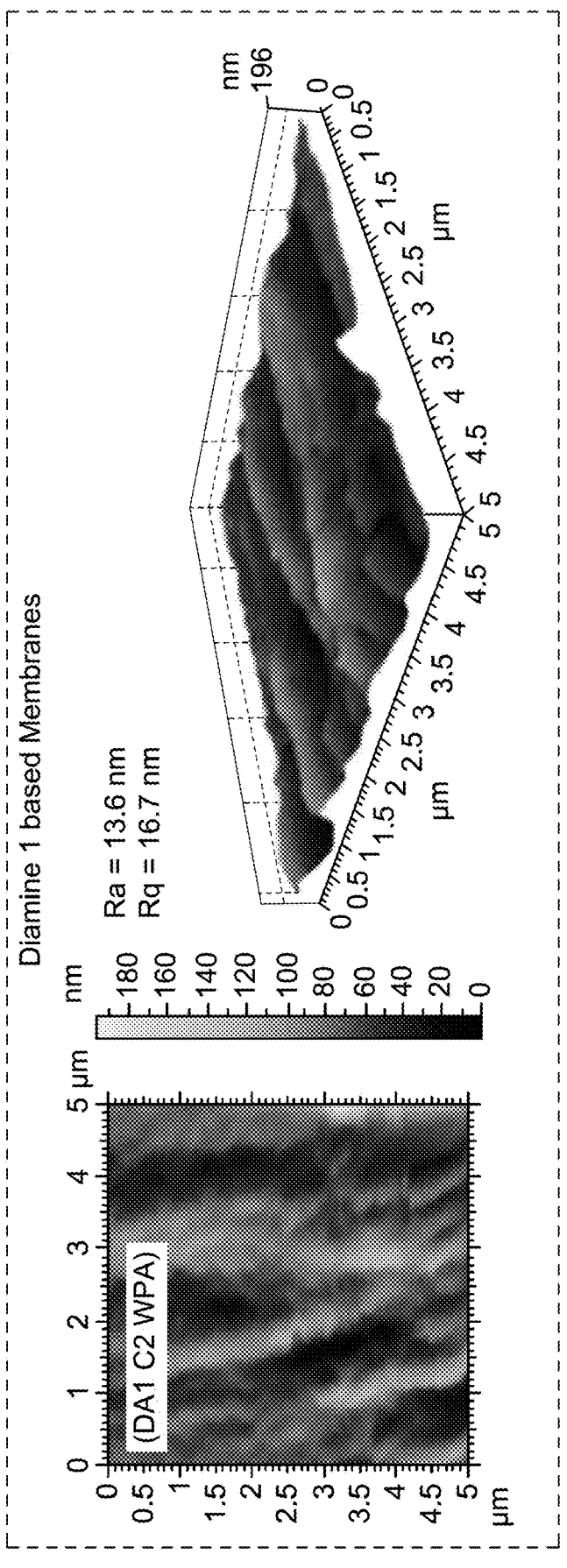
FIG. 4E depicts the AFM results for the DA1 membrane without polyamide, at the concentration 'C2', according to certain embodiments.
Figure 4F:
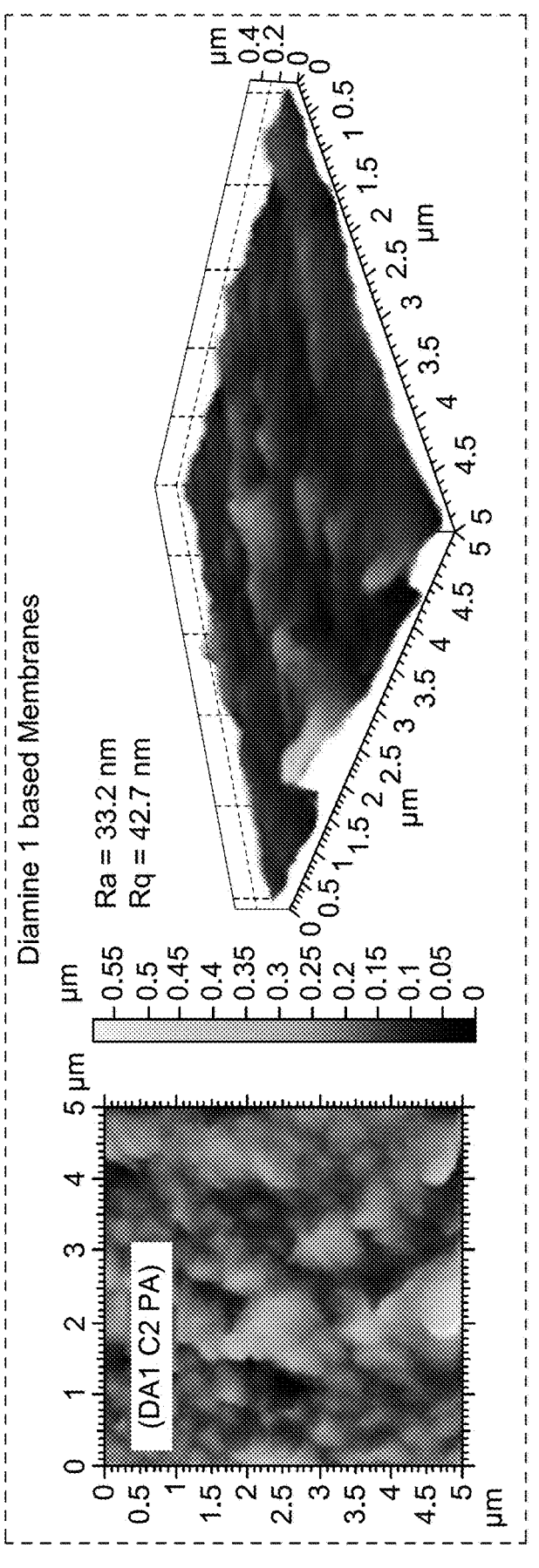
FIG. 4F depicts the AFM results for the DA1 membrane with polyamide, at the concentration 'C2', according to certain embodiments.
Figure 4G:
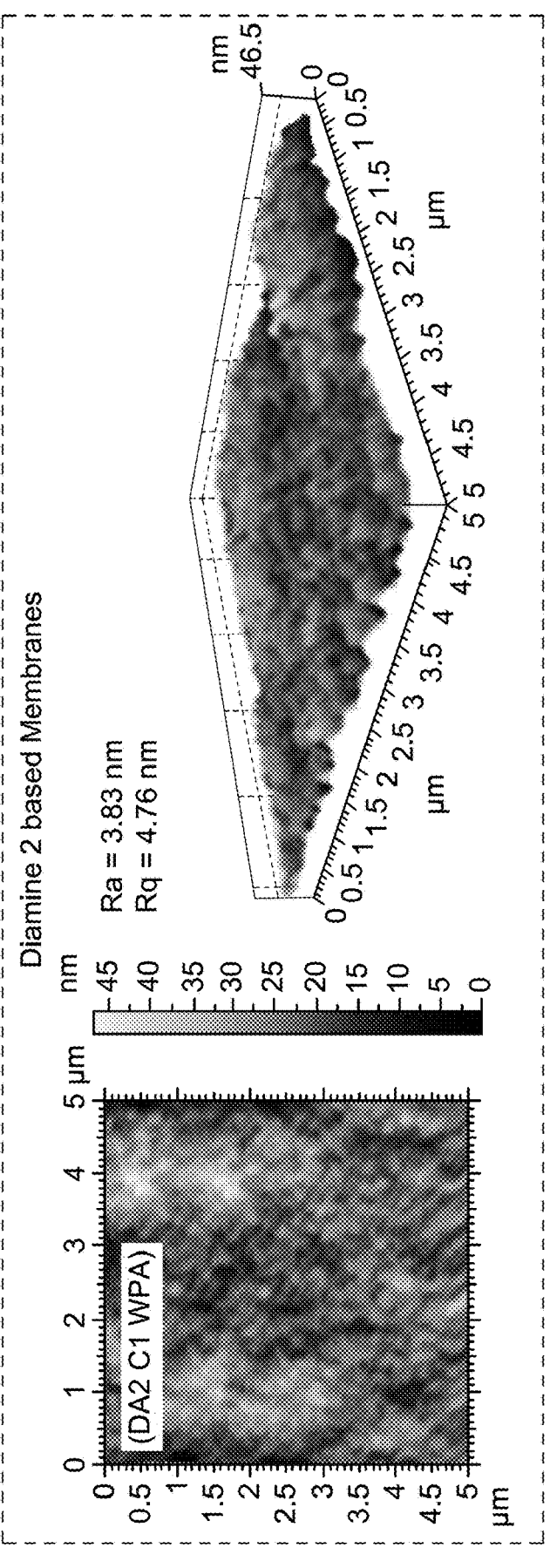
FIG. 4G depicts the AFM results for the DA2 membrane without polyamide, at the concentration 'C1', according to certain embodiments.
Figure 4H:
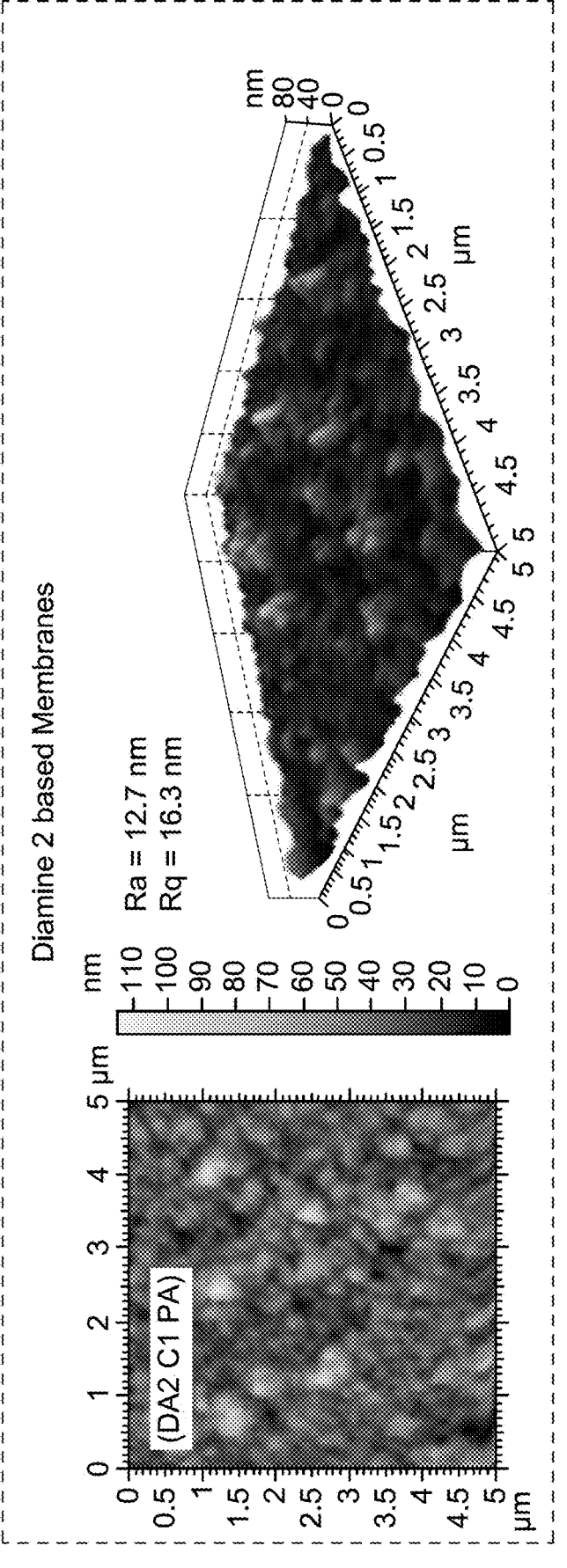
FIG. 4H depicts the AFM results for the DA2 membrane with polyamide, at the concentration 'C1', according to certain embodiments.
Figure 4I:
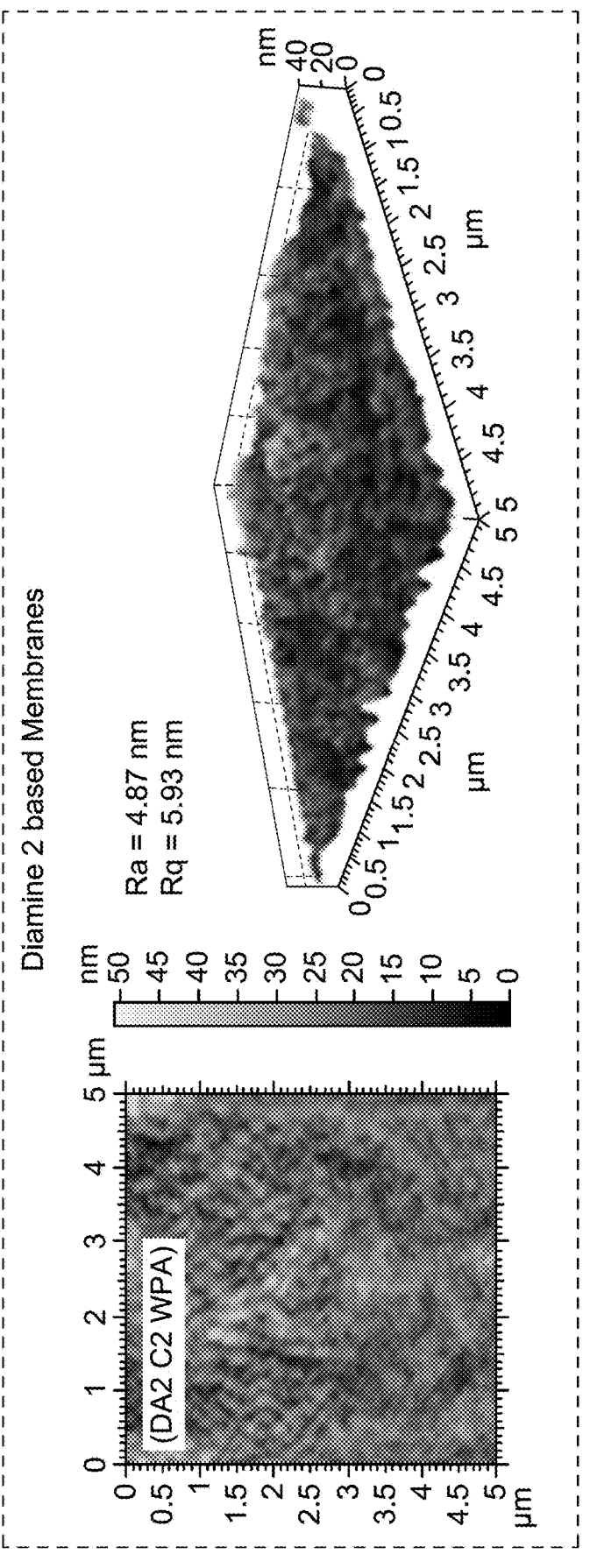
FIG. 4I depicts the AFM results for the DA2 membrane without polyamide, at the concentration 'C2', according to certain embodiments.
Figure 4J:
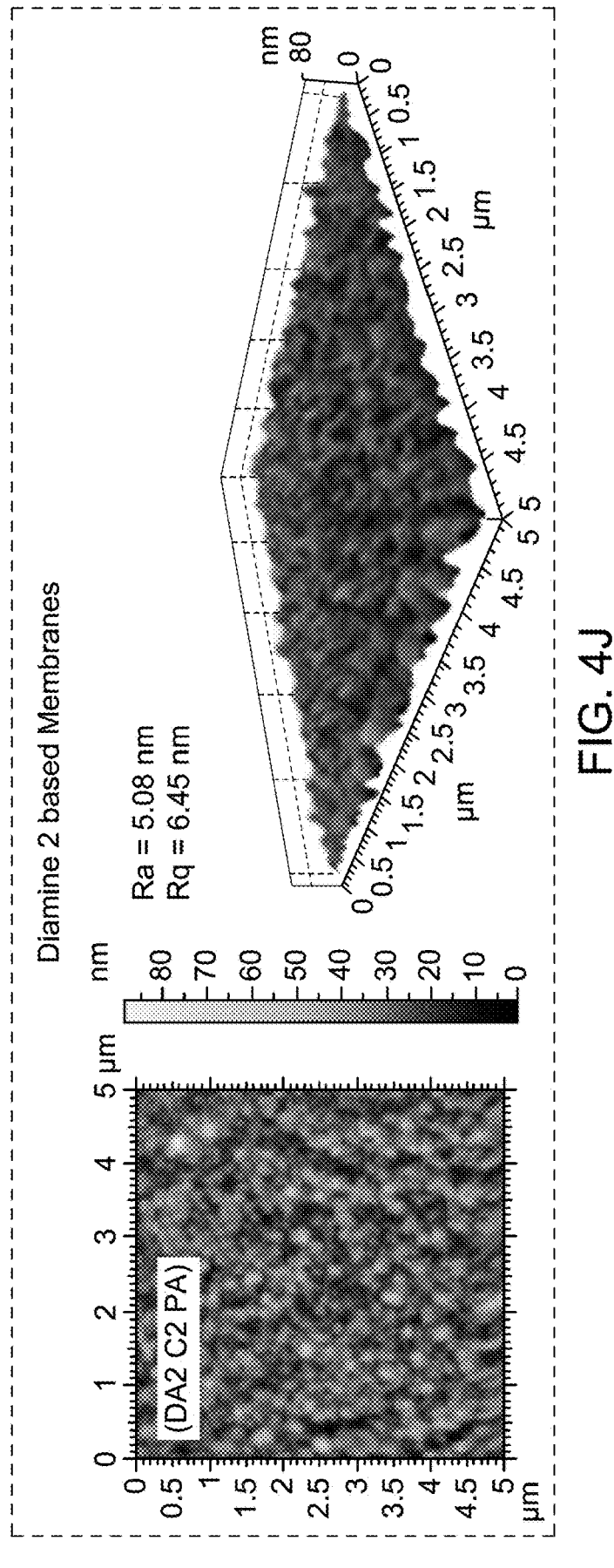
FIG. 4J depicts the AFM results for the DA2 membrane with polyamide, at the concentration 'C2', according to certain embodiments.
Figure 4K:
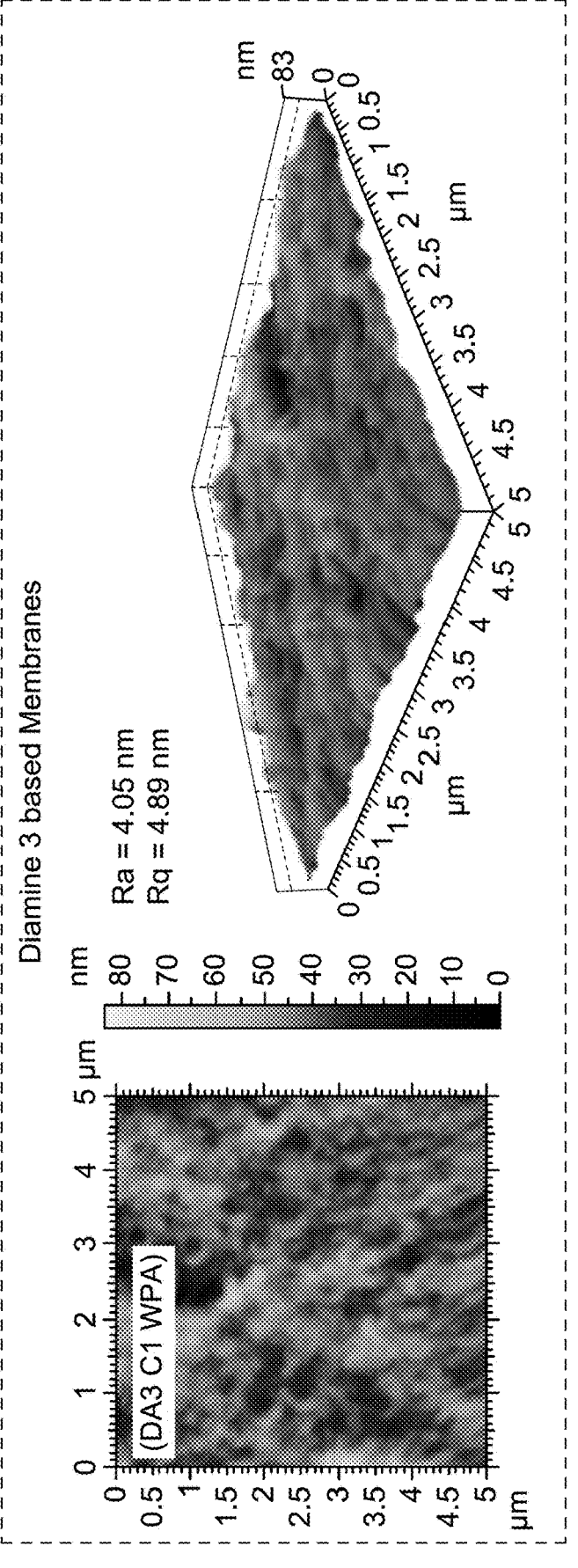
FIG. 4K depicts the AFM results for the DA3 membrane without polyamide, at the concentration 'C1', according to certain embodiments.
Figure 4L:
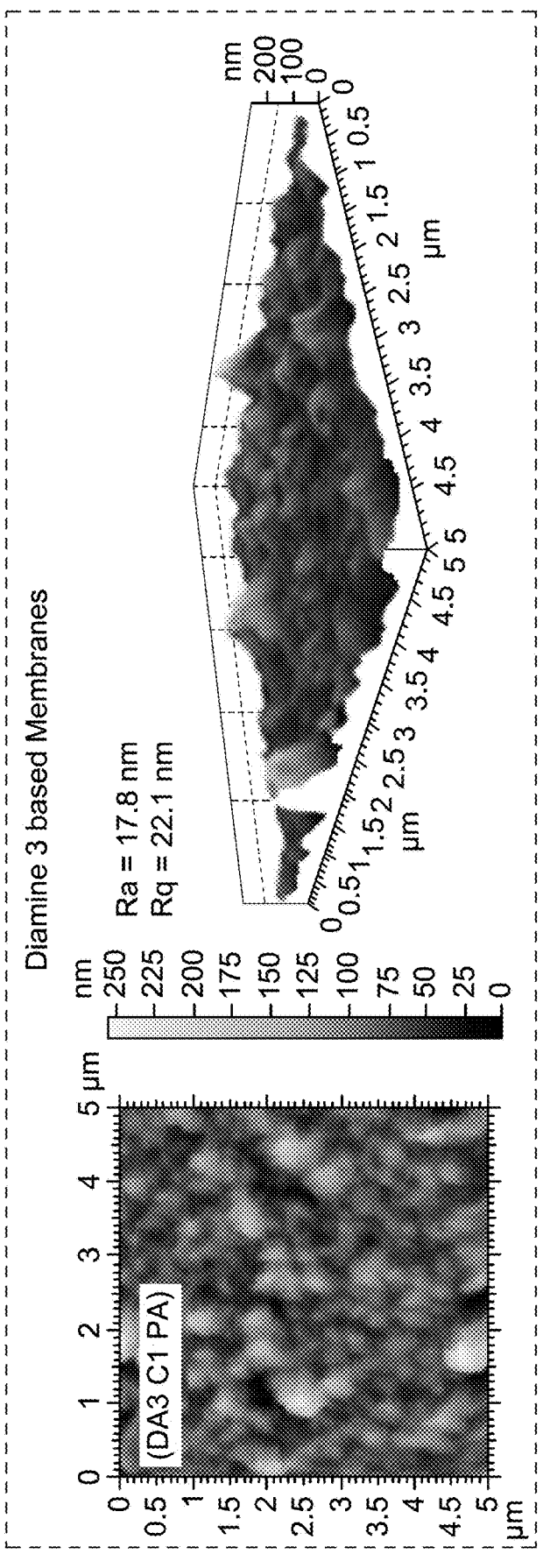
FIG. 4L depicts the AFM results for the DA3 membrane with polyamide, at the concentration 'C1', according to certain embodiments.
Figure 4M:
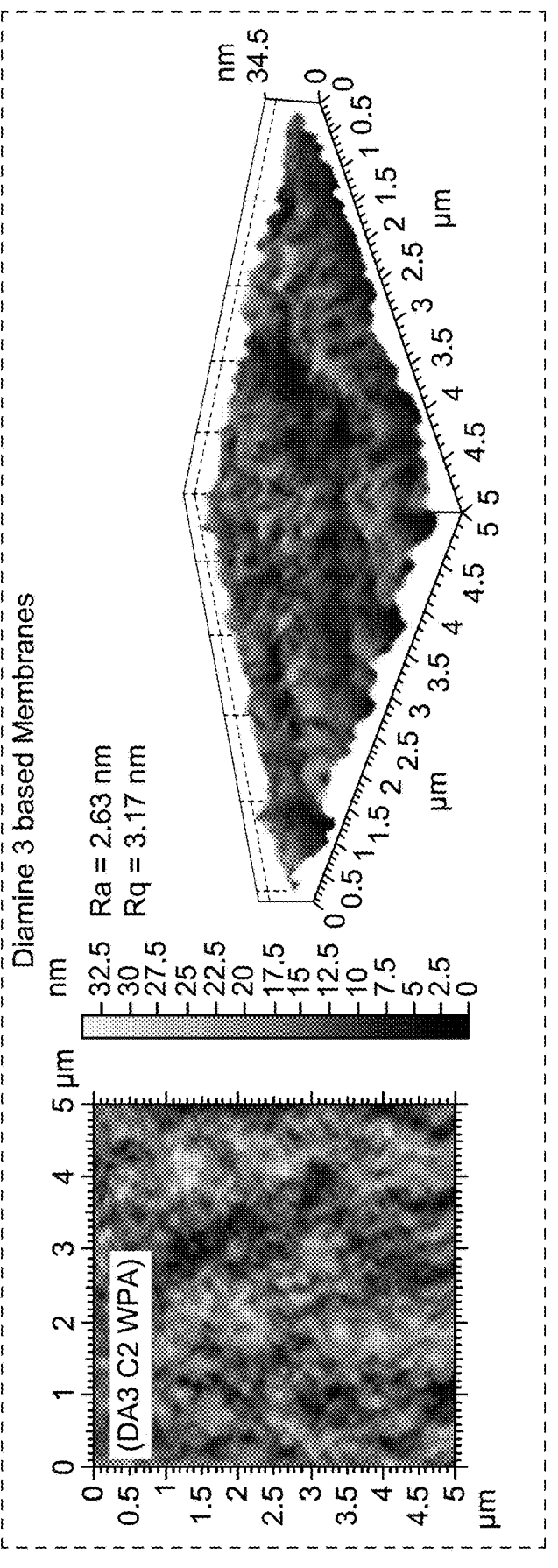
FIG. 4M depicts the AFM results for the DA3 membrane without polyamide, at the concentration 'C2', according to certain embodiments.
Figure 4N:
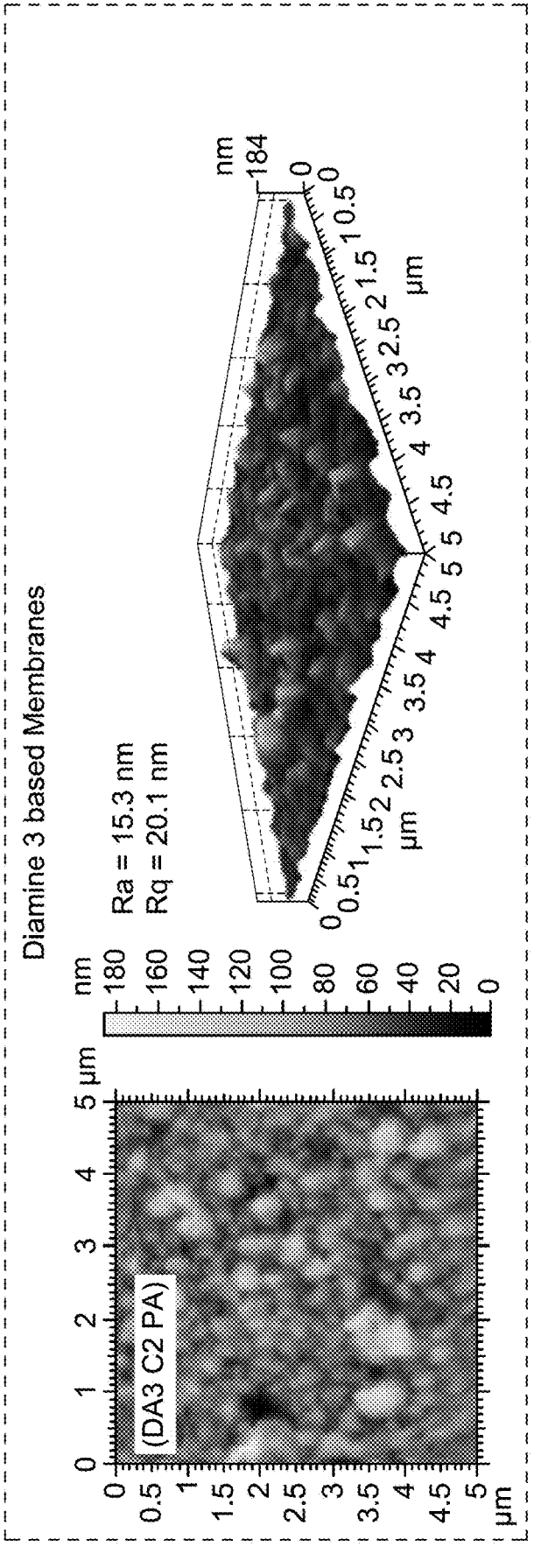
FIG. 4N depicts the AFM results for the DA3 membrane with polyamide, at the concentration 'C2', according to certain embodiments.

The surface morphology observations obtained through FESEM analysis were found to be consistent and in agreement with the surface roughness profiles determined by atomic force microscopy (AFM). As illustrated in FIGS. 4A-4N, the three-dimensional AFM images demonstrated the characteristic ridge-and-valley morphological features typically associated with membranes fabricated through interfacial polymerization (IP) processes. The surface roughness of the fabricated membranes may be a parameter directly influencing the permeability performance of membranes [K. Singh, S. Devi, H. C. Bajaj, P. Ingole, J. Choudhari, H. Bhrambhatt, *Optical Resolution of Racemic Mixtures of Amino Acids through Nanofiltration Membrane Process, Sep Sci Technol* 49 (2014) 2630-2641]. Researchers systematically investigated the influence of surface roughness on the permeate flux of poly(vinylidene fluoride) membranes [S. H. Woo, J. Park, B. R. Min, *Relationship between permeate flux and surface roughness of membranes with similar water contact angle values, Sep Purif Technol* 146 (2015) 187-191; and S. H. Woo, B. R. Min, J. S. Lee, *Change of surface morphology, permeate flux, surface roughness and water contact angle for membranes with similar physicochemical characteristics (except surface roughness) during microfiltration, Sep Purif Technol* 187 (2017) 274-284]. The evaluations revealed that membranes possessing smoother surface characteristics exhibited superior permeate flux when compared to membranes exhibiting rougher surfaces. Similarly, it was reported that in case of nanofiltration (NF) membranes, hydrophilic membranes with smoother surfaces provide the highest normalized flux relative to those membranes exhibiting rough surfaces and increased hydrophobicity [K. Boussu, Y. Zhang, J. Cocquyt, P. Van der Meeren, A. Volodin, C. Van Haesendonck, J. A. Martens, B. Van der Bruggen, *Characterization of polymeric nanofiltration membranes for systematic analysis of membrane performance, J Memb Sci* 278 (2006) 418-427].

Furthermore, the impact of surface morphology on the permeability performance of reverse osmosis (RO) and nanofiltration (NF) membranes was studied, where it was observed that membranes with rougher surfaces demonstrated a significant decline in flux in comparison to membranes with smoother surfaces [E. M. Vrijenhoek, S. Hong, M. Elimelech, *Influence of membrane surface properties on initial rate of colloidal fouling of reverse osmosis and nanofiltration membranes, J Memb Sci* 188 (2001) 115-128].

The phenomenon was principally attributed to the tendency of particulate matter to deposit preferentially within the pore-like valleys of rough membrane surfaces, resulting in a mechanism commonly referred to as 'valley clogging.' Such rapid accumulation of particles within these surface valleys increases the resistance to flow across the membrane, subsequently causing a reduction in the overall permeate flux and ultimately leading to the fouling of the membrane. In view of the evaluations above, it may therefore be inferred that a membrane surface exhibiting smooth morphology may facilitate a higher clean water flux and a reduced fouling propensity, as solutes are less likely to be retained or deposited on the membrane surface.

In terms of quantitative assessment, the surface roughness parameter was described using roughness average (Ra) values. The increase in Ra values, which was consistently observed for membranes following interfacial polymerization, was considered to correspond to the thickness of the polyamide (PA) film formed over the support layer. The thickness of the PA film was dependent upon the diffusion characteristics and solubility behaviour of piperazine (PIP) in the aqueous phase and Trimesoyl chloride (TMC) in the organic phase. When the solubility of PIP in TMC was high, the resulting PA film could be thicker, which might lead to an increase in Ra values [J. Xiang, Z. Xie, M. Hoang, D. Ng, K. Zhang, *Effect of ammonium salts on the properties of poly(piperazineamide) thin film composite nanofiltration membrane, J Memb Sci* 465 (2014) 34-40].

Moreover, a comparative analysis was conducted between the unmodified polysulfone (Psf) PA membrane and the membranes modified with diamines, specifically DA2C1PA, DA2C2PA, DA3C1PA, and DA3C2PA. The analysis revealed that the surface smoothness of the latter membranes had significantly increased. The surface smoothness was evident from the Ra values, which were lower in comparison to the Psf PA membrane. In particular, when the membranes were incorporated with 0.1 wt. % concentration of each respective diamine, the surface morphology progressively became smoother. The DA2C2PA membrane demonstrated an approximately 85% reduction in Ra value relative to the Psf PA membrane, while the DA3C2PA membrane exhibited an approximate 54% reduction in surface roughness average. However, the DA1C1PA and DA1C2PA membranes displayed surface roughness characteristics similar to that of the unmodified Psf PA membrane. Such findings were in agreement with the FESEM analysis results and further confirmed the successful formation of the polyamide layer and the significant influence exerted by the diamine-modified support layers on the formation and morphology of the resultant polyamide layer.

Figure 5A:
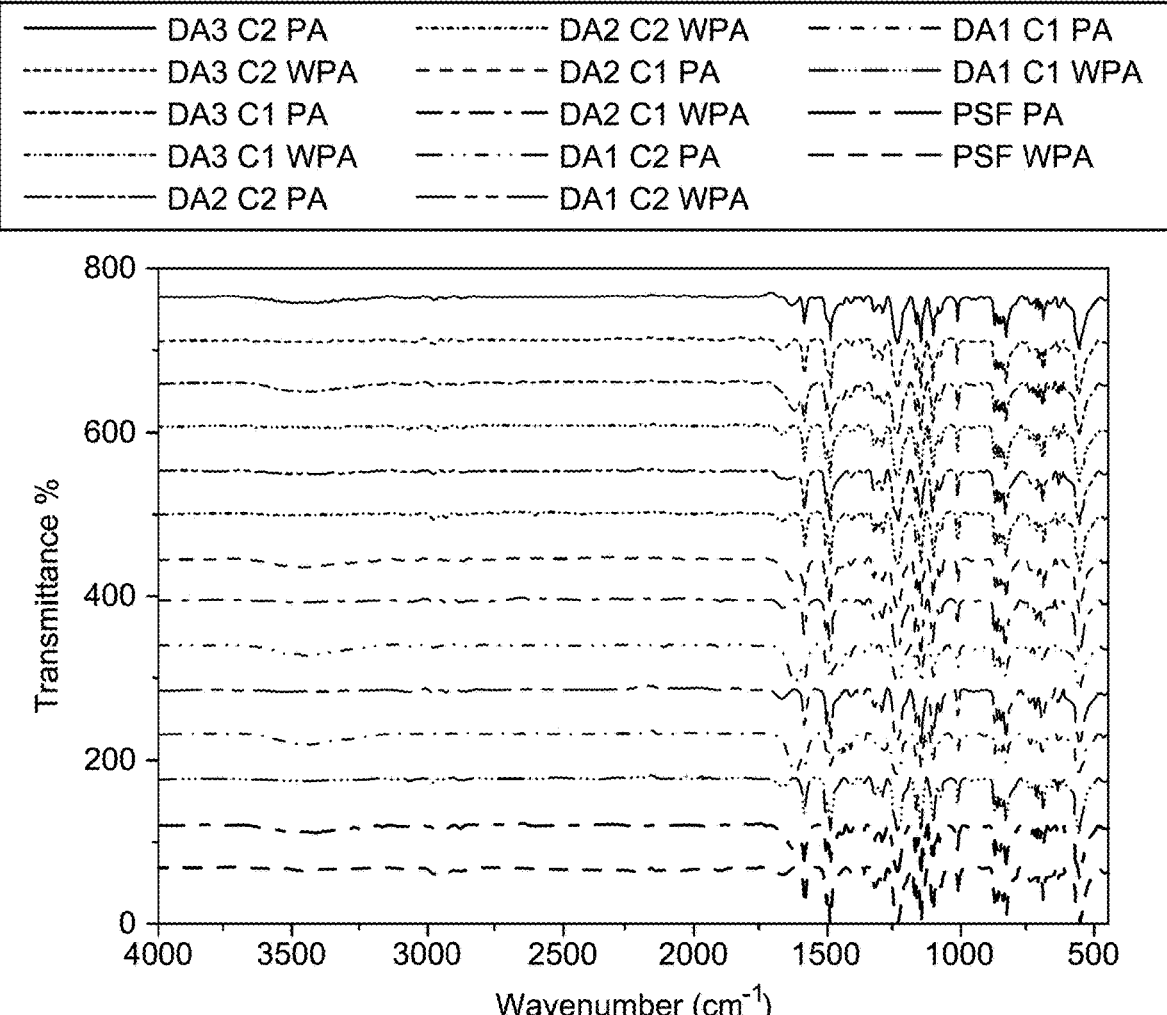
FIGS. 5A and 5B depict attenuated total reflectance-Fourier transform infrared (ATR-FTIR) spectra of some membranes, according to certain embodiments.
Figure 5B:
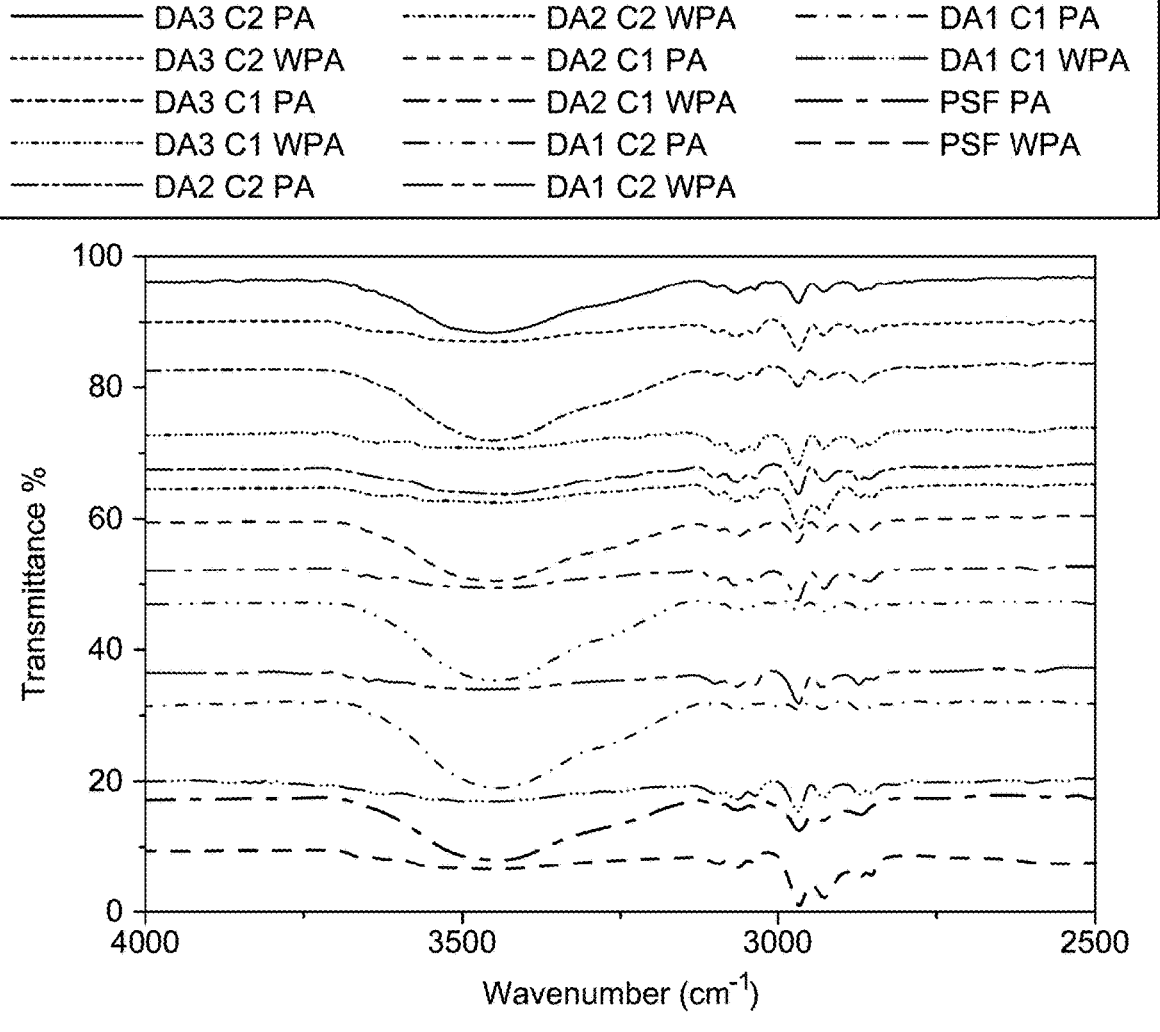

Further confirmation of chemical modifications was obtained through ATR-FTIR spectroscopy analysis, which was conducted for both the Psf WPA/PA membranes and the diamine-modified supports/membranes, as illustrated in FIGS. 5A and 5B. Following the formation of the PA thin film, a broad and characteristic absorption band was observed at approximately 3458 cm$^{-1}$, corresponding to the stretching vibration of the —NH bond. The distinctive band appeared in all membranes subsequent to the formation of the PA layer, which confirmed the presence of the PA layer on the membrane surface.

In the case of the diamine-modified WPA supports (DAxCyWPA), this band was also observed with reduced intensity, which was attributable to the limited presence of diamines within the support layer resulting in a smaller absorption band corresponding to —NH stretching. For the unmodified Psf WPA membrane, the above-described characteristic band was absent in the same region, confirming the absence of both diamines and the PA layer. In addition, all membranes exhibited the characteristic absorption bands of polysulfone, which appeared at approximately 1148 cm$^{-1}$, 1237 cm$^{-1}$, and 1584 cm$^{-1}$, corresponding to O—S—O stretching, C—O—C stretching, and C—C aromatic stretching vibrations, respectively. Another common absorption band appearing in all spectra in the range of 1620 cm$^{-1}$ to 1670 cm$^{-1}$ was attributed to the stretching vibrations of the C=O bond, representing the presence of TMC crosslinker and amide linkage [Y. Mansourpanah, M. Samimi, *Preparation and characterization of a low-pressure efficient polyamide multi-layer membrane for water treatment and dye removal, Journal of Industrial and Engineering Chemistry* 53 (2017) 93-104]. The results of the FTIR analysis thus conclusively confirmed both the successful incorporation of diamines within the support layer and the subsequent formation of the polyamide layer over the support layer.

In order to assess the surface wettability characteristics of the fabricated membranes, static water contact angle measurements were conducted, which served to evaluate the hydrophilicity or hydrophobicity of the membrane surface. The surface wettability of membranes can be important for governing antifouling behaviour thereof [A. Waheed, U. Baig, A. Matin, S. M. S. Jillani, N. A. A. Qasem, I. H. Aljundi, *Synthesis of co-polyamide reverse osmosis membrane constituting a linear aliphatic triamine and m-phenylenediamine for enhanced desalination performance, Desalination* 549 (2023) 116311]. The images of water droplets on the surfaces of various membranes, along with corresponding water contact angle values thereof measured before and after PA layer formation are shown in FIG. 6.

The unmodified Psf WPA membrane exhibited a distinctly hydrophobic surface nature, as evidenced by a contact angle of 90°. Upon the formation of the PA film over the Psf WPA membrane, resulting in the Psf PA membrane, the contact angle decreased, indicating an increase in surface hydrophilicity. The increased hydrophilicity was attributed to the inherently hydrophilic nature of the polyamide layer. Moreover, it was observed that the incorporation of diamines at a lower concentration (C1=0.05 wt. %) further enhanced the hydrophilicity of the membranes in comparison to the unmodified Psf WPA membrane. However, when the concentration of diamines was increased to a higher level (C2=0.1 wt. %), the surface hydrophilicity correspondingly decreased. The above-described trend was consistently observed across other modified membranes, both with and without the polyamide layer.

The observed increase in hydrophilicity was ascribed to the presence of hydrophilic amino groups within the diamine structures, as shown in FIGS. 1A-1C. However, despite the known hydrophobic characteristics of the diamines, the higher concentration (C2) of diamines led to a reduction in surface hydrophilicity. Furthermore, it was considered that the presence of polyvinylpyrrolidone (PV P), an additive possessing hydrophilic properties, might have contributed to the increased hydrophilicity. PVP was incorporated into the casting solution to enhance the porosity of the membrane structure; however, residual amounts of PVP may have remained on the membrane surface, influencing the overall wettability behaviour of the membrane [S. S. Nayab, M. A. Abbas, S. Mushtaq, B. Khan Niazi, M. Batool, G. Shehnaz, N. Ahmad, N. M. Ahmad, *Anti-Foulant Ultrafiltration Polymer Composite Membranes Incorporated with Composite Activated Carbon/Chitosan and Activated Carbon/Thiolated Chitosan with Enhanced Hydrophilicit, Membranes (Basel)* 11 (2021) 827].

Figure 6:
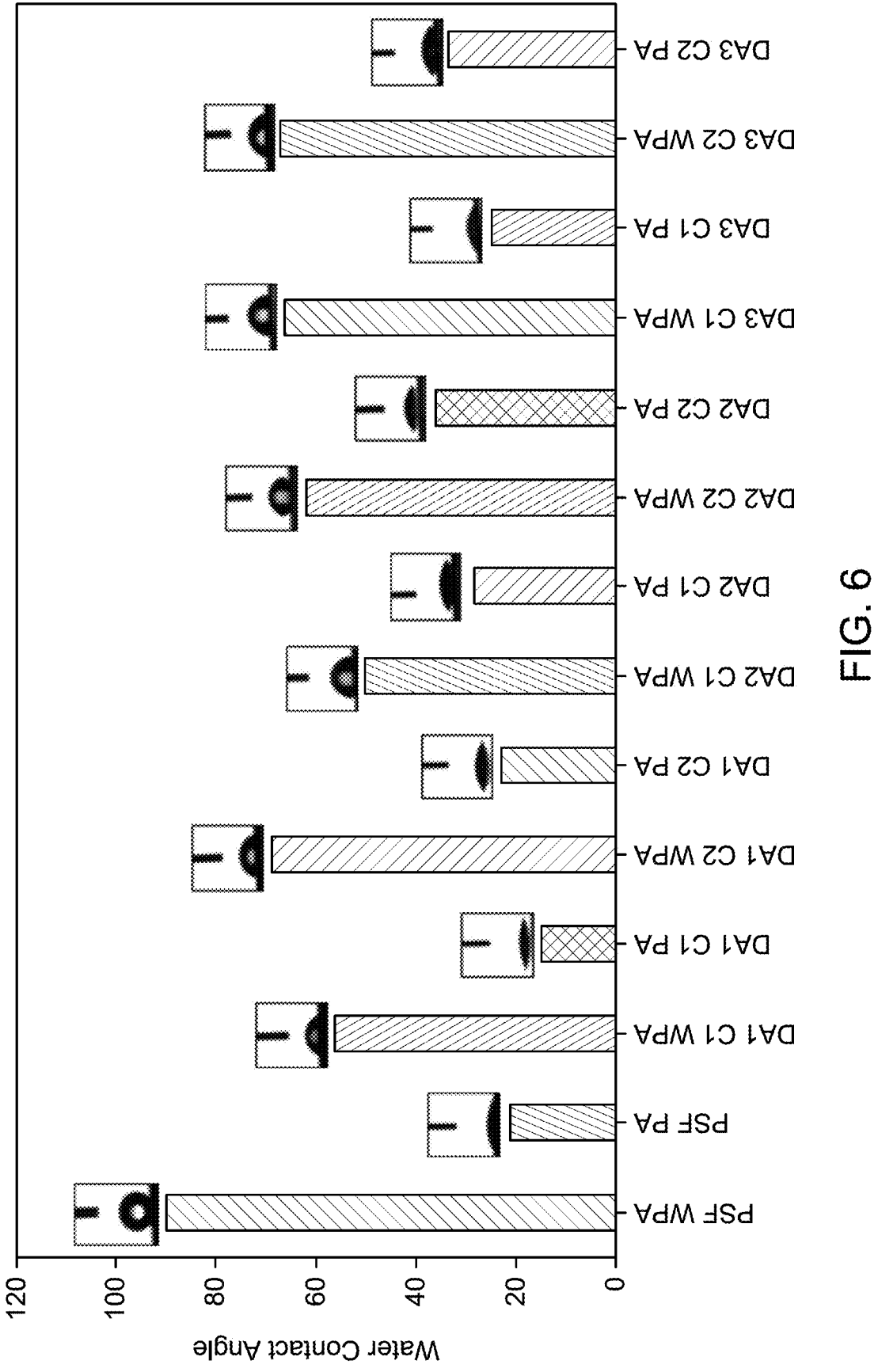
FIG. 6 depicts water contact angle measurements of the pristine and diamine-modified membranes, illustrating changes in surface hydrophobicity resulting from diamine incorporation, according to certain embodiments.

As illustrated in FIG. 6, the hydrophobic character of the polysulfone (Psf) support membrane was selectively modified by incorporating varying amounts of diamine compounds into the casting solutions. The modification was considered to influence the subsequent formation of the polyamide (PA) active layer. The increase in the hydrophilicity of the support layer was deemed to promote enhanced wettability of the PIP monomer, thereby facilitating favourable interactions between PIP molecules and the polar amino functional groups present within the pores of the substrate. The aforementioned interaction was believed to influence the interfacial polymerization (IP) reaction mechanism, resulting in the formation of the PA layer deeper within the pores of the support membrane and consequently yielding a smoother PA layer structure [H. Mokarizadeh, S. M oayedfard, M. S. Maleh, S. I. G. P. Mohamed, S. Nejati, M. R. Esfahani, *The role of support layer properties on the fabrication and performance of thin-film composite membranes: The significance of selective layer-support layer connectivity, Sep Purif Technol* 278 (2021) 119451]. The phenomenon observed above was further substantiated by contact angle measurements, which corroborated the morphological observations obtained from FESEM and AFM analyses. Collectively, the modification of the support membrane with diamines was found to promote the fabrication of membranes possessing smoother surface morphologies.

Furthermore, according to the present disclosure, the presence of amino functional groups from the hydrophobic diamines within the support matrix may facilitate an enhanced PA formation due to probable chemical interactions between TMC with PIP and diamine groups, as schematically depicted in FIG. 2. Such interactions were found to establish chemical linkages between the support and the active PA layer.

Figure 7:
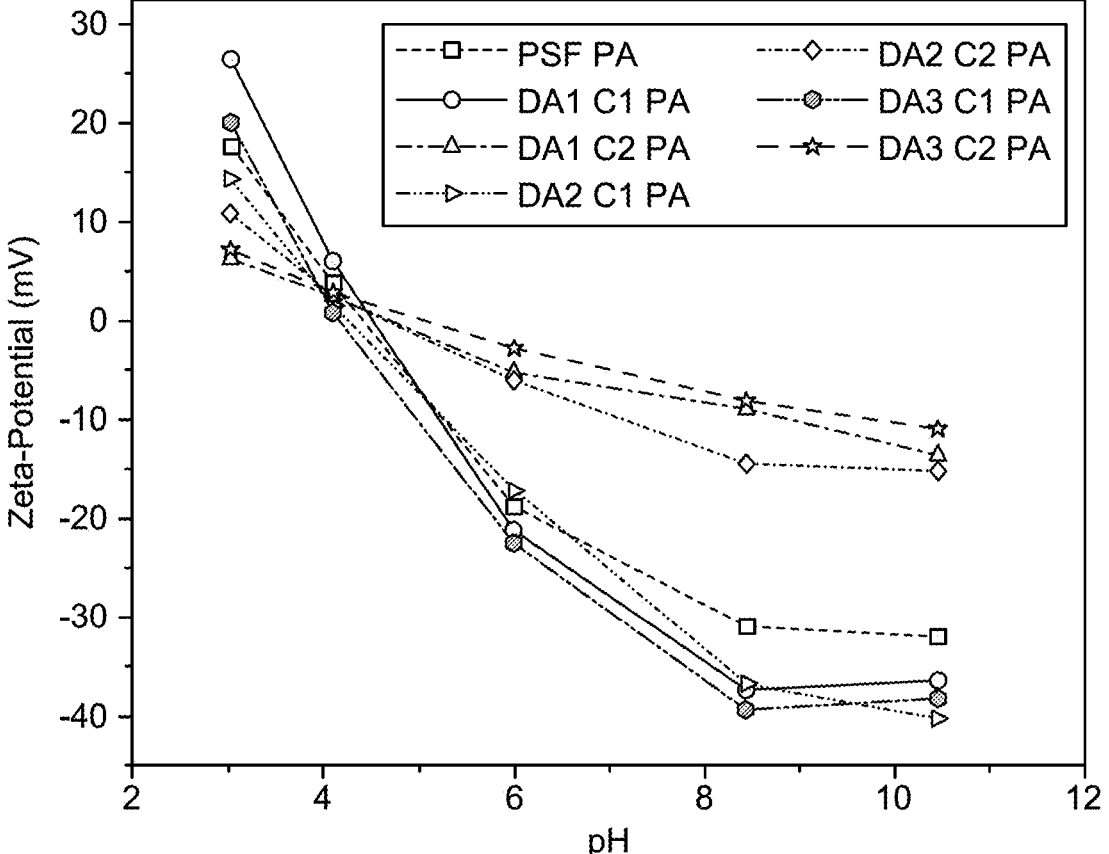
FIG. 7 is a graph depicting the surface zeta potential profiles of the fabricated membranes coated with polyamide layer as a function of pH, according to certain embodiments.

The surface charge characteristics of the PA active layer may be a parameter influencing the solute rejection behaviour of the fabricated membranes. It has been reported that a typical PIP-TMC membrane exhibits a surface charge of approximately-30 mV at a pH of about 8 [Y. Yu, S. Lee, S. Hong, *Effect of solution chemistry on organic fouling of reverse osmosis membranes in seawater desalination, J Memb Sci* 351 (2010) 205-213]. In accordance with the observation above, the unmodified Psf PA membrane demonstrated a surface charge of −30.8 mV at a pH of approximately 8, as shown in FIG. 7. The membranes modified with diamines at the C1 concentration level exhibited a similar trend in zeta potential curves. However, notable variations in surface charge values were observed. Specifically, the incorporation of DA1, DA2, or DA3 at C1 concentration levels imparted higher negative surface charge values in comparison with the Psf PA membrane. Such behaviour was attributed to the deprotonation of carboxyl (—COOH) functional groups at elevated pH conditions, where the presence of —COOH groups was likely due to partial hydrolysis of unreacted acyl chloride groups during the IP process. Conversely, at a higher loading of diamines (C2), it was proposed that the unreacted acyl groups might be utilized by the excess diamine content, resulting in relatively less negative surface potentials. Consequently, the surface charge values of membranes fabricated with C2 concentration of DA1, DA2, and DA3 were measured as −8.9 mV, −14.3 mV, and −8 mV, respectively, as illustrated in FIG. 7.

Figure 8A:
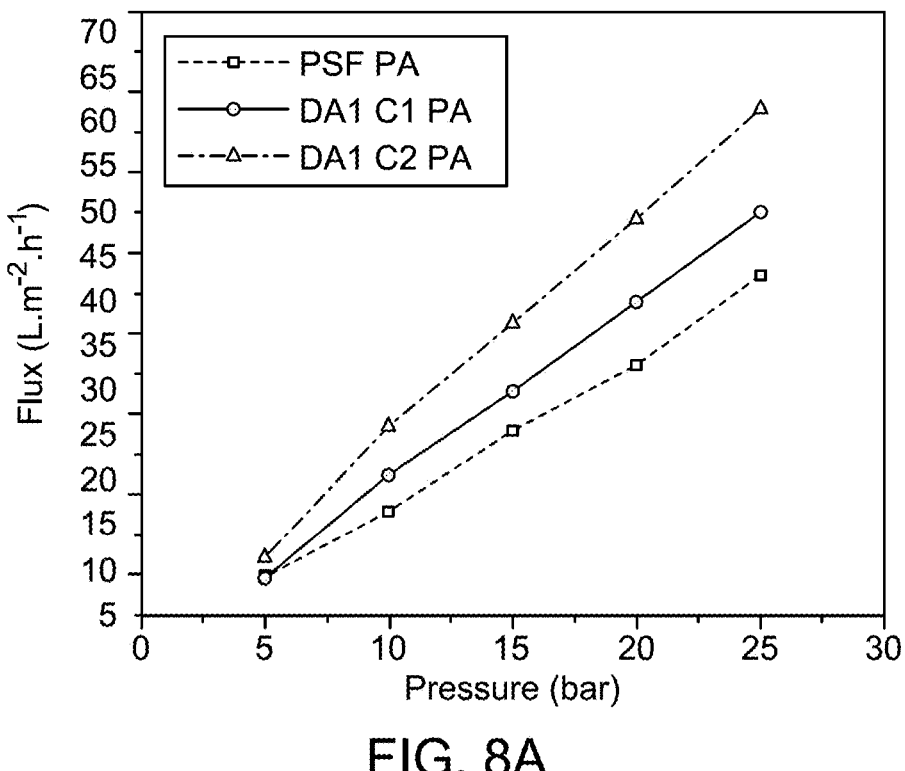
FIG. 8A is a graph depicting the water flux measurements for the fabricated membranes (PSF PA, DA1C1PA, DA1C2PA), at different pressure gradients, according to certain embodiments.
Figure 8B:
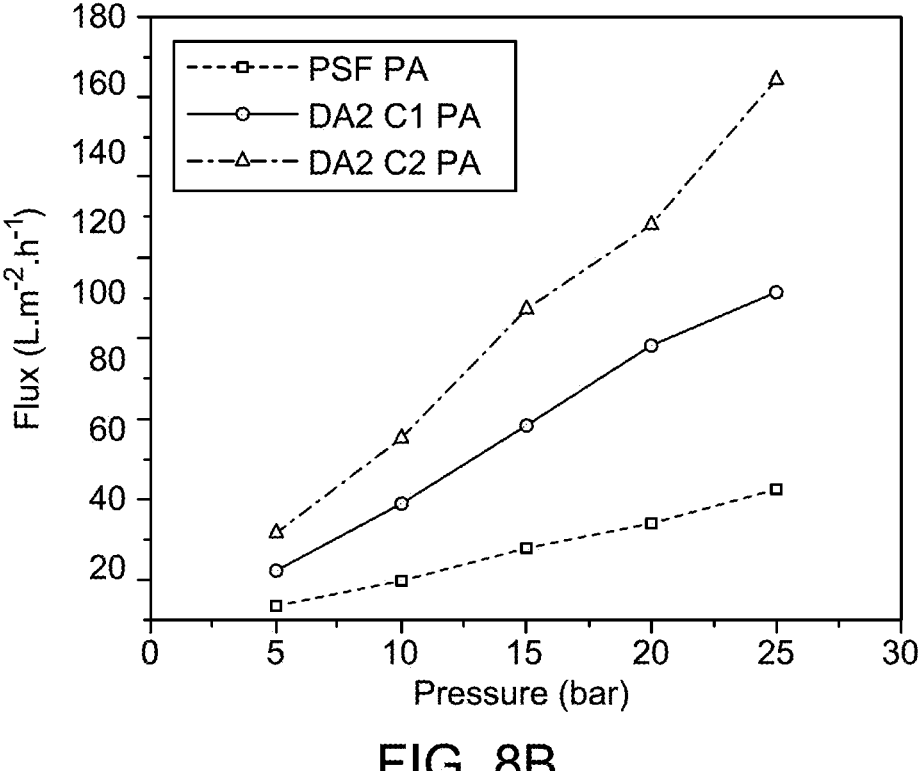
FIG. 8B is a graph depicting the water flux measurements for the fabricated membranes (PSF PA, DA2C1PA, DA2C2PA), at different pressure gradients, according to certain embodiments.
Figure 8C:
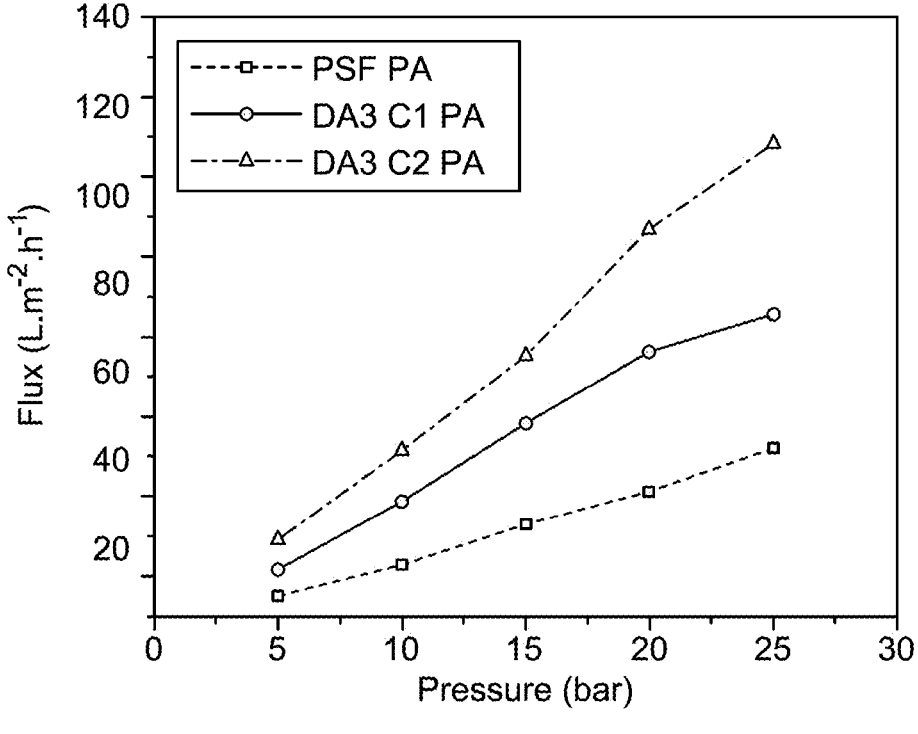
FIG. 8C is a graph depicting the water flux measurements for the fabricated membranes (PSF PA, DA3C1PA, DA3C2PA), at different pressure gradients, according to certain embodiments.

The water permeation performance of the Psf PA and the diamine-modified membranes was evaluated under varying transmembrane pressures ranging from 5 bar to 25 bar, where 15 bar was selected as the desirable operating pressure. A cross the evaluated pressures, the diamine-modified membranes exhibited significant improvements in permeate flux when compared to the unmodified Psf PA membrane, as represented in FIGS. 8A-8C. It was further observed that the permeate flux enhancement correlated with increasing diamine concentration in the support layer. Specifically, the Psf PA membrane, representative of a typical PIP-TMC membrane, demonstrated a flux value of 25.8 $L\cdot m^{-2}\cdot h^{-1}$ at 15 bar. The incorporation of diamines resulted in a flux enhancement of 16.2% and 46.1% for DA1C1PA and DA1C2PA membranes, respectively. Similarly, the DA2C1PA, DA2C2PA, DA3C1PA, and DA3C2PA membranes exhibited substantially higher flux values of 61.5 $L\cdot m^{-2}\cdot h^{-1}$, 95.4 $L\cdot m^{-2}\cdot h^{-1}$, 48.5 $L\cdot m^{-2}\cdot h^{-1}$, and 63.8 $L\cdot m^{-2}\cdot h^{-1}$, respectively. The improvements were attributed to the synergistic effects of the chemical structure and functional properties of the respective diamines incorporated within the support layer, which effectively modulated the formation of a distinctive PA active layer. The uniqueness of the PA active layer was further ascribed to enhanced hydrophilicity, reduced surface roughness of the support membrane, and increased crosslinking density of the PA layer.

For salt rejection testing, typical salts commonly found in sea water and waste water such as $MgCl_2$, $MgSO_4$, $CaCl_2$, NaCl, and $Na_2SO_4$ (2000 $mg\cdot L^{-1}$) were selected due to their industrial relevance in desalination processes and known scaling tendencies. The selection of both monovalent and divalent salts enabled an effective evaluation of membrane performance. The feed and permeate solution concentrations were measured using a TDS meter. As presented in FIGS. 9A-9C, membranes depicted higher rejection efficiencies for salts containing divalent cations compared to the monovalent salt (NaCl). In particular, enhanced hydrophilicity of the support membrane may result in increased permeate flux as well as improved NaCl rejection [L. Shen, X. Zhang, L. Tian, Z. Li, C. Ding, M. Yi, C. Han, X. Yu, Y. Wang, *Constructing substrate of low structural parameter by salt induction for high-performance TFC-FO membranes, J Memb Sci* 600 (2020) 117866]. Hence, the improved NaCl removal performance observed in DA1C1PA, DA2C1PA, and DA3C1PA membranes may be explained, which exhibited the highest hydrophilicity among all tested membranes, as previously noted in FIG. 6. Although various mechanisms contribute to solute separation, size exclusion was considered the predominant mechanism governing salt rejection in nanofiltration membranes, which confirmed the successful fabrication of nanofiltration membranes using the proposed modification strategy with rejection characteristics consistent with prior findings [Y. S. Khoo, P. S. Goh, W. J. Lau, A. F. Ismail, M. S. Abdullah, N. H. Mohd Ghazali, N. K. E. M. Yahaya, N. Hashim, A. R. Othman, A. Mohammed, N. D. A. Kerisnan, M. A. Mohamed Yusoff, N. H. Fazlin Hashim, J. Karim, N. salmi Abdullah, *Removal of emerging organic micropollutants via modified-reverse osmosis/nanofiltration membranes, Chemosphere* 305 (2022) 135151].

Figure 9A:
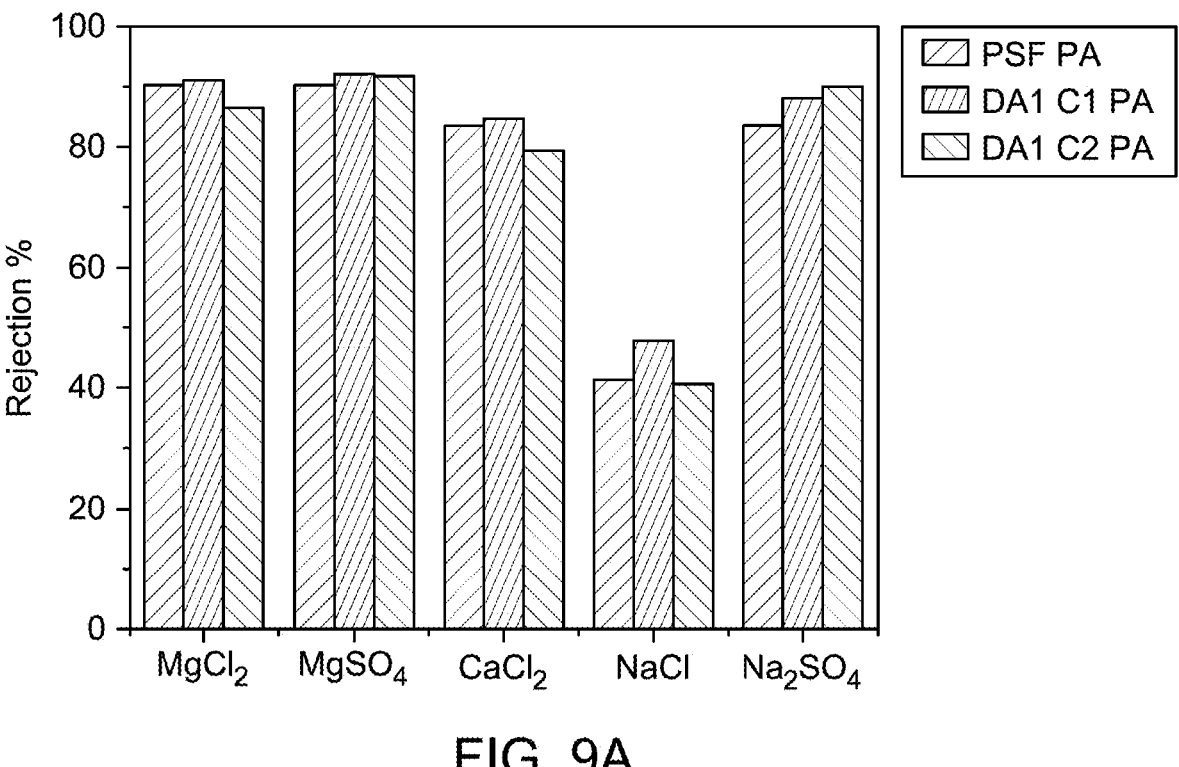
FIG. 9A illustrates the salt rejection performance of the fabricated membranes (PSF PA, DA1C1PA, DA1C2PA), according to certain embodiments.
Figure 9B:
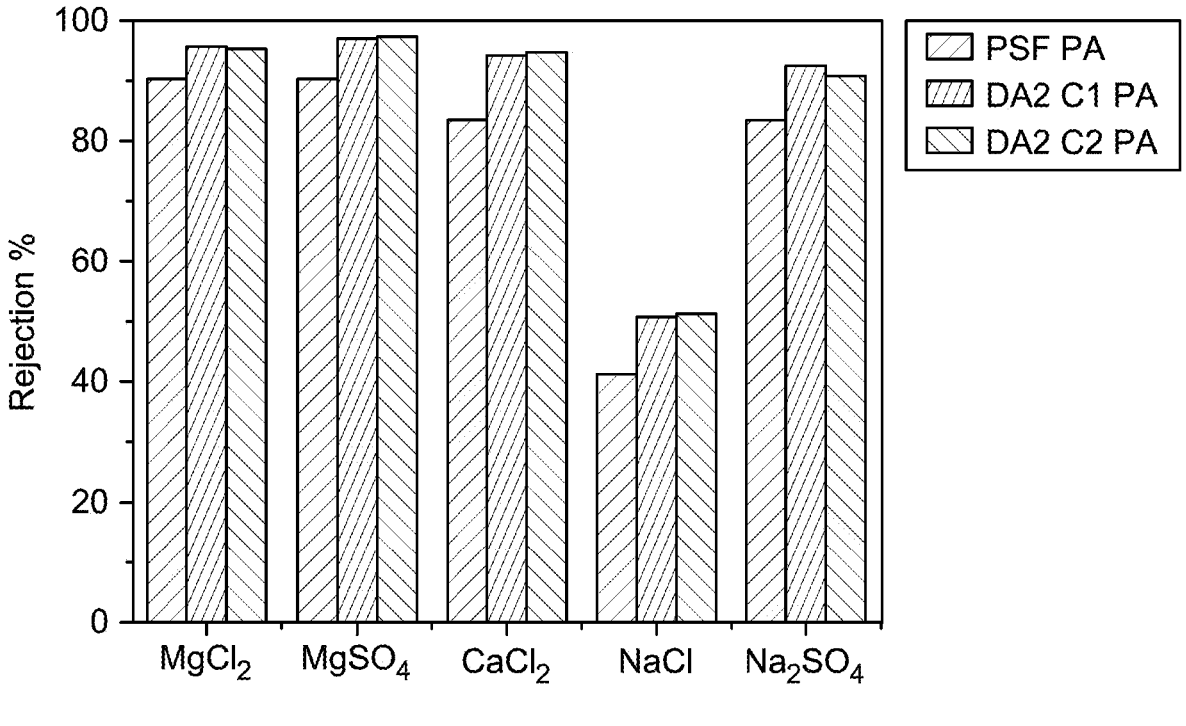
FIG. 9B illustrates the salt rejection performance of the fabricated membranes (PSF PA, DA2C1PA, DA2C2PA), according to certain embodiments.
Figure 9C:
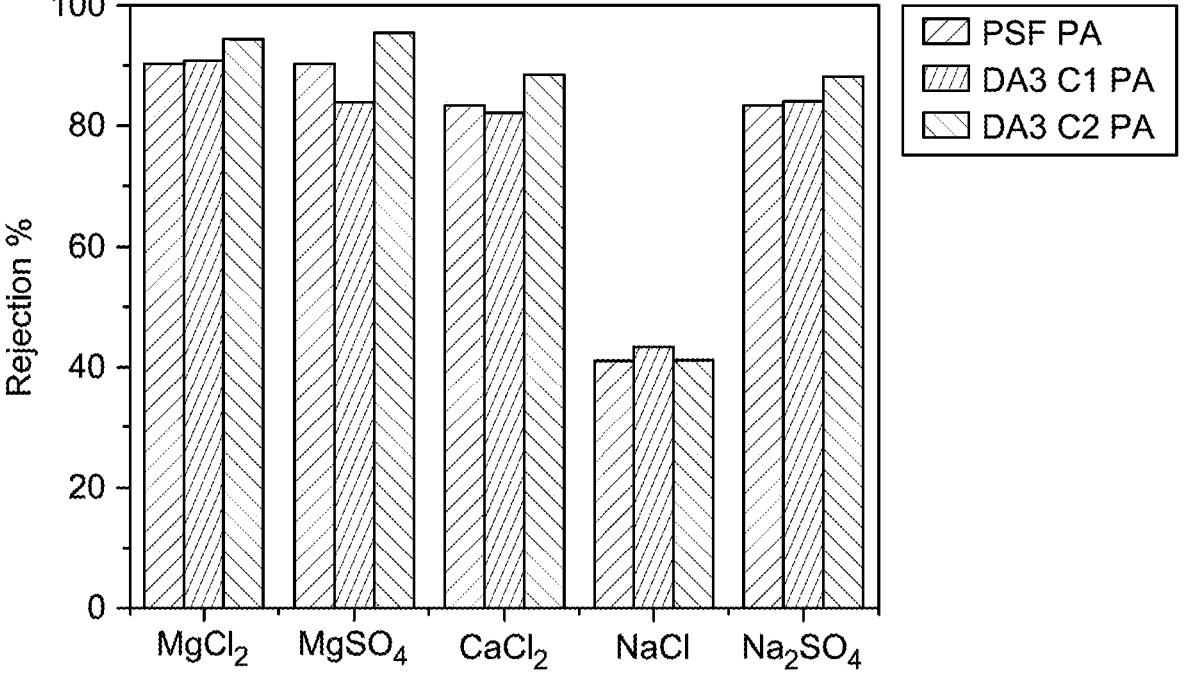
FIG. 9C illustrates the salt rejection performance of the fabricated membranes (PSF PA, DA3C1PA, DA3C2PA), according to certain embodiments.

Moreover, as shown in FIGS. 9A-9C, the DA1C1PA and DA1C2PA membranes demonstrated comparable or superior salt rejection performance relative to the unmodified Psf PA membrane. The membranes modified with DA2 exhibited improved salt rejection capability compared to the Psf PA membrane, further achieved high rejection performance for the monovalent salt (NaCl). In particular, the NaCl rejection of the Psf PA membrane was recorded at 41.0%, which increased to 50.8% and 51.0% for DA2C1PA and DA2C2PA membranes, respectively. While the DA3C1PA membrane exhibited salt rejection performance comparable to the Psf PA membrane, the DA3C2PA membrane demonstrated a substantial improvement in rejecting all tested salts. It is noteworthy that all C1 concentration membranes exhibited comparable or improved salt rejection, in addition to significantly higher flux values, suggesting that C1 concentration represents a functional diamine loading level for blending with the Psf support membrane.

In addition to salts, pharmaceutically active compounds, considered as persistent micropollutants in various water resources, were selected for rejection testing using the fabricated membranes. A set of five compounds was utilized at a feed concentration of 10 $mg\cdot L^{-1}$, and the concentrations of feed and permeate solutions were quantified using high-performance liquid chromatography (HPLC) equipped with a diode array detector (DAD). Although several mechanisms influence the rejection of pharmaceutical compounds by nanofiltration membranes, fouling or adsorption of such compounds on the membrane surface is often considered undesirable, as the fouling may lead to flux decline and operational challenges. Therefore, simultaneous flux measurements were conducted during testing to confirm the absence of fouling or adsorption phenomena, where no significant flux decline was observed throughout the analysis. Consequently, size exclusion was regarded as the dominant mechanism for pharmaceutical compound rejection [S. Muhammad Sajid Jillani, A. Waheed, U. Baig, I. H. Aljundi, *Fabrication of highly efficient nanofiltration membranes decorated with praseodymium based triamino-functionalized MCM-41 for desalination and micropollutants removal, Arabian Journal of Chemistry* 17 (2024) 105450].

Figure 10A:
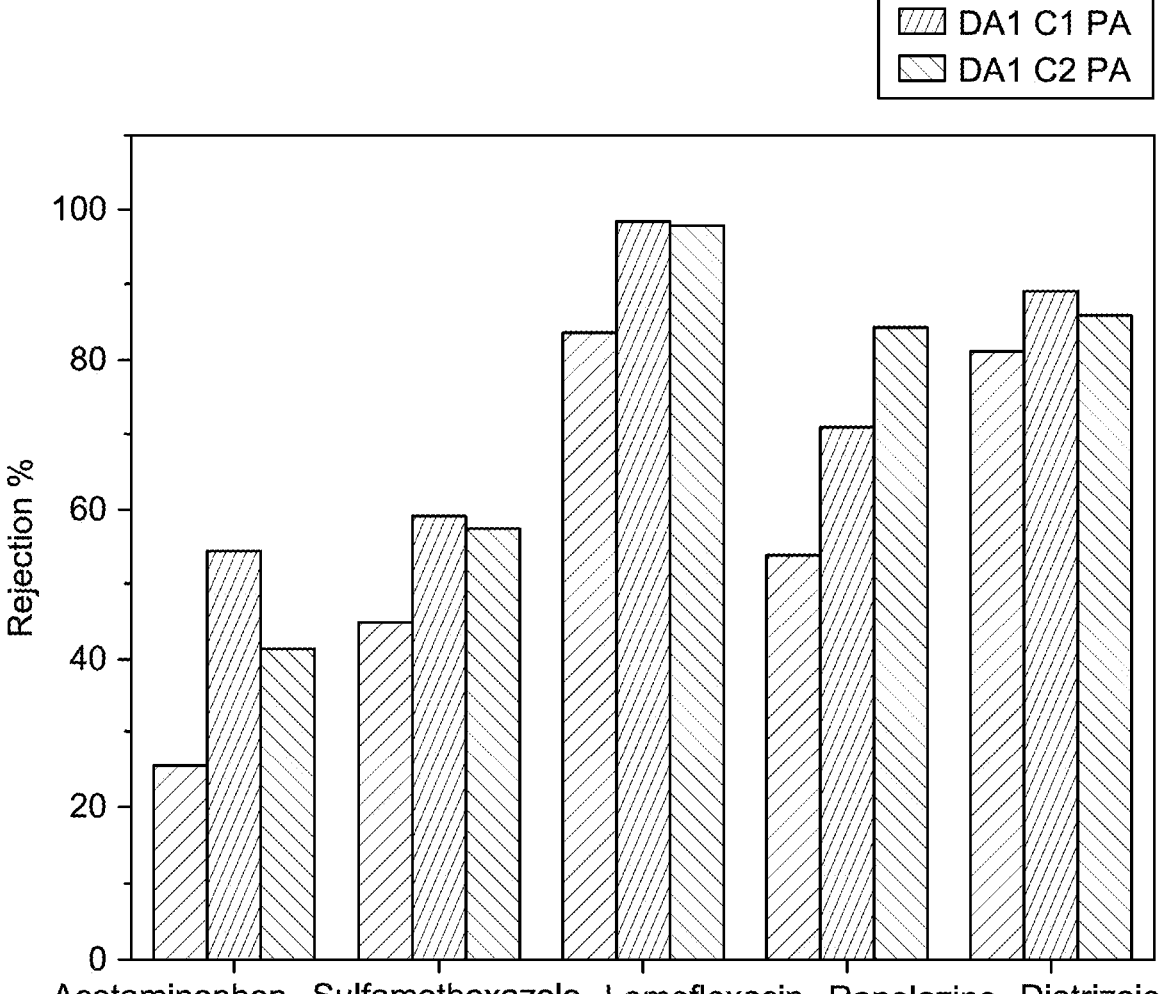
FIG. 10A illustrates pharmaceutical product rejection percentage for fabricated membranes (PSF PA, DA1C1PA, DA1C2PA), at a permeate pressure of 15 bar, according to certain embodiments.
Figure 10B:
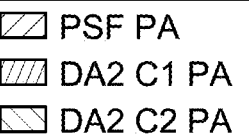
FIG. 10B illustrates pharmaceutical product rejection percentage for fabricated membranes (PSF PA, DA2C1PA, DA2C2PA), at the permeate pressure of 15 bar, according to certain embodiments.
Figure 10B:
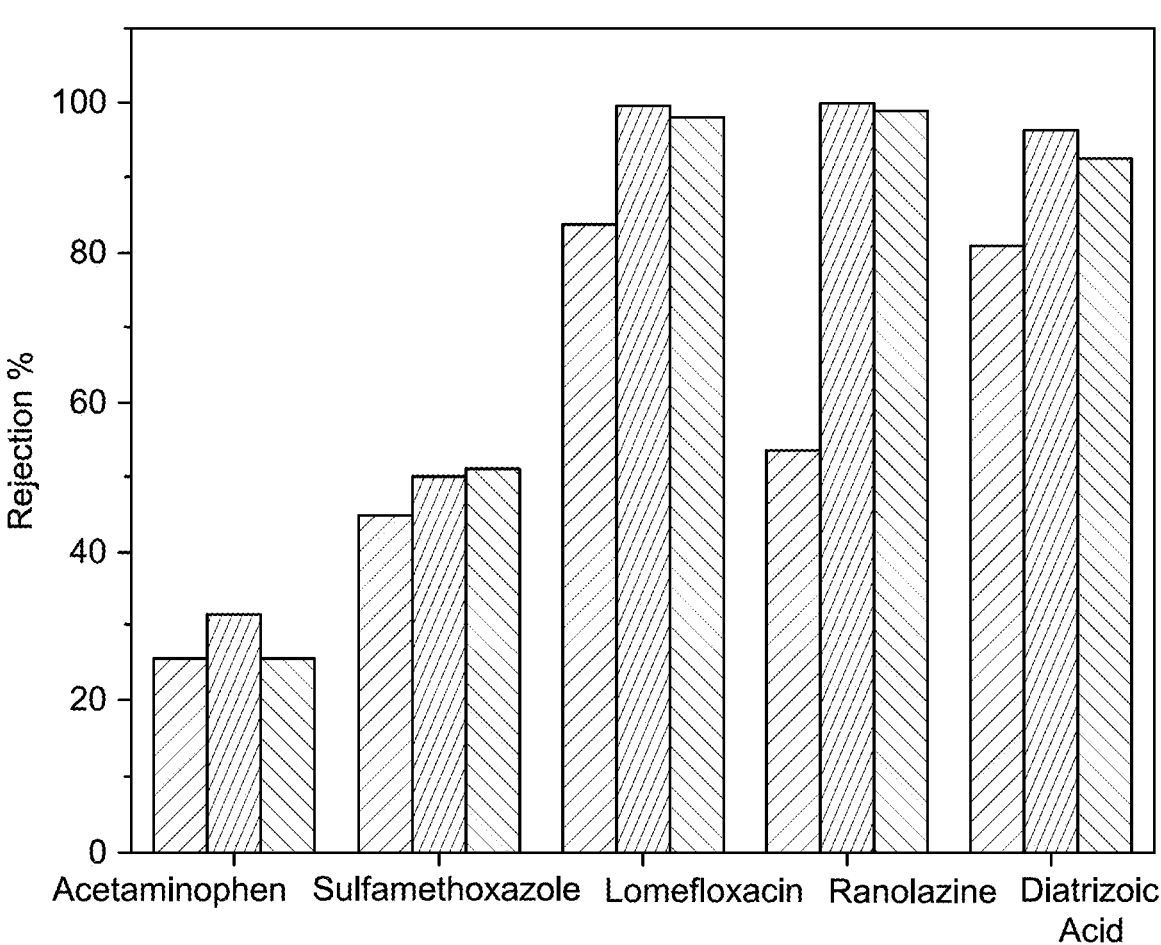
Figure 10C:
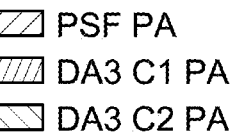
FIG. 10C illustrates pharmaceutical product rejection percentage for fabricated membranes (PSF PA, DA3C1PA, DA3C2PA), at the permeate pressure of 15 bar, according to certain embodiments.
Figure 10C:
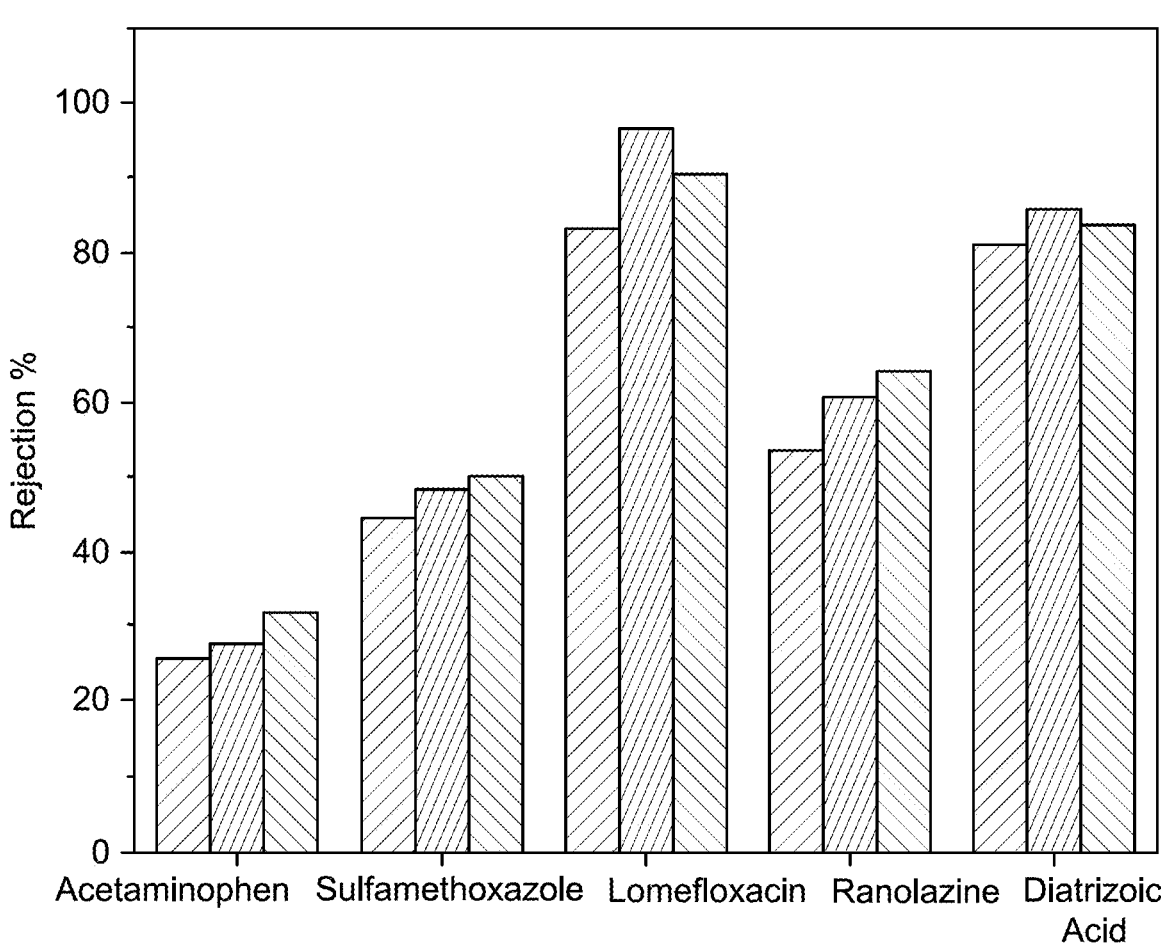

As shown in FIGS. 10A-10C, the rejection of acetaminophen by the Psf PA membrane was found to be 25.8%, which increased substantially to 54.5% for the DA1C1PA membrane. All tested pharmaceutical compounds exhibited higher or comparable rejection values when filtered through DA1-modified membranes. A consistent trend of improved or similar rejection was also observed for membranes modified with DA2 and DA3, with the additional advantage of a considerably higher permeate flux when compared to the unmodified Psf PA membrane.

Aspects of the present disclosure are directed towards a high flux nanofiltration membrane including a support layer of polysulfone by incorporating hydrophobic diamines into the casting solution. The incorporation of selected hydrophobic diamines within the polysulfone support has facilitated the development of hydrophobic interactions with the polysulfone matrix and has additionally enabled the formation of chemical bonds with the crosslinked polyamide during the interfacial polymerization of PIP and TMC. The foregoing configuration has resulted in the formation of a polyamide active layer possessing distinctive structural and functional characteristics, which yielded a series of nanofiltration membranes capable of achieving equivalent or improved salt rejection and micropollutant removal while significantly enhancing the permeate flux. In accordance with the present disclosure, three types of hydrophobic diamines were examined, including 2-chloro-4,6-diamino-1,3,5-triazine, benzoguanamine, and acetoguanamine. Comprehensive characterizations of the fabricated membranes were carried out, including morphological analysis by FESEM and AFM, chemical functionality evaluation by FTIR spectroscopy, surface wettability analysis through water contact angle measurements, and surface charge determination by zeta potential analysis. The experimental findings confirmed the successful incorporation of hydrophobic diamines into the support layer, the effective formation of the polyamide active layer, and the advantageous characteristics imparted to the modified membranes, which provided desirable water permeation without compromising the rejection of salts and micropollutants. Specifically, the addition of hydrophobic diamines enabled the membranes to maintain comparable or superior rejection of salts and pharmaceutical compounds while increasing the permeate flux from 25.8 $L \cdot m^{-2} \cdot h^{-1}$ (for Psf PA) to 37.7 $L \cdot m^{-2} \cdot h^{-1}$ (for DA1C2PA), 63.8 $L \cdot m^{-2} \cdot h^{-1}$ (for DA3C2PA), and 95.4 $L \cdot m^{-2} \cdot h^{-1}$ (for DA2C2PA) at an operating pressure of 15 bar. Accordingly, the present disclosure demonstrates that the modification of the polysulfone support by blending with hydrophobic diamines provides a viable and effective approach for enhancing the separation performance of nanofiltration membranes.

Numerous modifications and variations of the present disclosure are possible in light of the above teachings. It is therefore to be understood that within the scope of the appended claims, the invention may be practiced otherwise than as specifically described herein.

The invention claimed is:

1. A membrane, comprising:
a base layer;
a support layer formed on the base layer and comprising polysulfone (Psf), polyvinylpyrrolidone (PVP) and at least one diamine selected from the group consisting of 2-chloro-4,6-diamino-1,3,5-triazine, benzoguanamine and acetoguanamine; and
a polyamide layer formed on the support layer and comprising a polyamide having repeating units derived from piperazine and repeating units derived from trimesoylchloride,
wherein the polyamide is covalently bonded to at least some molecules of the at least one diamine in the support layer via an amide bond,
wherein the support layer comprises 60-97 weight percent (wt. %) Psf, 1-35 wt. % PVP, and 0.02-5 wt. % the at least one diamine,
wherein the polyamide layer further comprises polyamide globules, and
wherein the globules have an average size of 100-1000 nm.

2. The membrane of claim 1, wherein the support layer is obtained by executing a wet phase inversion process of a casting solution comprising Psf, PVP and the at least one diamine.

3. The membrane of claim 2, wherein the casting solution comprises, based on a total weight of the casting solution:
10-30 wt. % of Psf;
0.5-5 wt. % of PVP; and
0.01 wt. % to 0.5 wt. % of the at least one diamine.

4. The membrane of claim 3, wherein the casting solution comprises, based on the total weight of the casting solution:
18 wt. % of Psf;
2 wt. % of PVP; and
0.05 wt. % to 0.1 wt. % of the at least one diamine.

5. The membrane of claim 2, wherein the casting solution is obtained by dissolving Psf, PVP and the at least one diamine in a solvent comprising N,N-dimethylacetamide (DMAC) at a temperature of 60-100° C.

6. The membrane of claim 5, wherein the support layer is obtained by executing the wet phase inversion process of the casting solution on the base layer comprising a nonwoven polyethylene terephthalate layer that is pre-saturated with DMAC.

7. The membrane of claim 1, wherein:
the polyamide is covalently bonded to the at least some molecules of the at least one diamine in the support layer via the amide bond so that the polyamide extends into pores of the support layer.

8. The membrane of claim 1, wherein:
molecules of the at least one diamine are homogeneously distributed in the support layer.

9. The membrane of claim 1, wherein:
the at least one diamine is benzoguanamine which is present in the casting solution at a concentration of 0.1 wt. % based on the total weight of the casting solution,
the membrane has a water flux rate of 95.4 $L \cdot m^{-2} \cdot h^{-1}$ at a feed pressure of 15 bar, and
a comparative membrane, which is the same as the membrane except without the at least one diamine, has a water flux rate of 25.8 $L \cdot m^{-2} \cdot h^{-1}$ at the feed pressure.

10. The membrane of claim 9, wherein:
the membrane has an 85% reduction in a surface roughness value compared to the comparative membrane.

11. The membrane of claim 9, wherein:
the membrane has a rejection rate of about 98% for ranolazine, and
the comparative membrane has a rejection rate of about 50% for ranolazine.

12. The membrane of claim 9, wherein:
the membrane has a rejection rate of about 51% for NaCl, and
the comparative membrane has a rejection rate of about 41% for NaCl.

13. The membrane of claim 1, wherein the polyamide layer is obtained by executing an interfacial polymerization process of a first solution comprising piperazine and a second solution comprising trimesoylchloride.

14. The membrane of claim 13, wherein:
the first solution comprises 2 wt. % of piperazine, 4 wt. % of triethylamine and water based on a total weight of the first solution, and
the second solution comprises 0.3 wt. % of trimesoylchloride and n-hexane based on a total weight of the second solution.

15. The membrane of claim 13, wherein the executing the interfacial polymerization process comprises:
immersing the support layer into the first solution;
removing the support layer from the first solution;
dipping the support layer into the second solution;
rinsing the support layer with n-hexane; and
maintaining the support layer at a temperature of 70° C. for 20 min.

16. The membrane of claim 1, wherein the support layer comprises 85-96 weight percent (wt. %) Psf, 4-15 wt. % PVP, and 0.20-0.50 wt. % the at least one diamine.

17. The membrane of claim 1, wherein the support layer further comprises an additional amine selected from the group consisting of 1,4-diaminobenzene, p-phenylenediamine, m-phenylenediamine, 4,4'-methylenedianiline, 2,4-diaminotoluene, 3,5-diaminobenzoic acid, 1,3-diamino-2-hydroxypropane, diamino-pyridine, 2,5-diamino-1,4-benzene, 4,6-diamino-1,3,5-triazine, 1,2-diaminocyclohexane, 1,3-diaminocyclohexane, 2,3-diaminopyridine, 2,5-diaminobenzene, 3,4-diaminophenylmethane, 1,4-diamino-2,3-dihydroxybutane, N,N'-bis(3-aminopropyl)ethylenediamine, and 1,6-diamino-hexane, wherein the concentration of the additional amine is 0.1 to 30% of the concentration of the at least one amine.

18. The membrane of claim 17, wherein the concentration of the additional amine is 10 to 20% of the concentration of the at least one amine.

19. The membrane of claim 1, wherein the globules have an average size of 180-500 nm.

\* \* \* \* \*